US012804682B2

(12) United States Patent
Ma et al.

(10) Patent No.: US 12,804,682 B2
(45) Date of Patent: Nov. 17, 2026

(54) WIRELESS COMMUNICATION METHOD, TERMINAL DEVICE AND NETWORK DEVICE

(71) Applicant: GUANGDONG OPPO MOBILE TELECOMMUNICATIONS CORP., LTD., Dongguan (CN)

(72) Inventors: Teng Ma, Dongguan (CN); Shichang Zhang, Dongguan (CN); Zhenshan Zhao, Dongguan (CN); Huei-Ming Lin, Taipei (TW)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 281 days.

(21) Appl. No.: 18/620,920

(22) Filed: Mar. 28, 2024

(65) Prior Publication Data

US 2024/0267937 A1 Aug. 8, 2024

Related U.S. Application Data

(63) Continuation of application No. PCT/CN2021/122196, filed on Sep. 30, 2021.

(51) Int. Cl.
*H04W 72/30* (2023.01)
*H04W 72/23* (2023.01)

(52) U.S. Cl.
CPC ........... *H04W 72/30* (2023.01); *H04W 72/23* (2023.01)

(58) Field of Classification Search
CPC ...... H04W 72/30; H04W 72/23; H04W 72/04
See application file for complete search history.

(56) References Cited

U.S. PATENT DOCUMENTS

2020/0374799 A1 11/2020 Kuang
2022/0182188 A1* 6/2022 Fu ......................... H04L 5/0055
(Continued)

FOREIGN PATENT DOCUMENTS

CN 110035481 A 7/2019
CN 111406394 A 7/2020
(Continued)

OTHER PUBLICATIONS

CMCC, "Summary#4 on Mechanisms to Support Group Scheduling for RRC_Connected UEs for NR MBS," 3GPP TSG RAN WG1 #106-e, R1-2108368, Aug. 20, 2021.
(Continued)

*Primary Examiner* — Richard T Torrente
(74) *Attorney, Agent, or Firm* — Ladas & Parry, LLP

(57) ABSTRACT

Provided in the embodiments of the present application are a wireless communication method, a terminal device and a network device. A band width part (BWP) timer is designed, and the continuities of a unicast service and an MBS during data reception are both taken into consideration. The wireless communication method includes that: a terminal device receives first signaling, wherein the first signaling includes first information and second information, the first information is used for configuring a first timer corresponding to a BWP, and the second information is used for configuring a second timer corresponding to a common frequency resource (CFR); or the first signaling includes third information, and the third information is used for configuring the first timer corresponding to the BWP and the second timer corresponding to the CFR.

20 Claims, 12 Drawing Sheets

(56) References Cited

U.S. PATENT DOCUMENTS

| | | | | |
|---|---|---|---|---|
| 2023/0269828 | A1* | 8/2023 | Shrivastava | H04W 76/30 370/312 |
| 2023/0276471 | A1* | 8/2023 | Latheef | H04W 4/06 370/312 |
| 2023/0363051 | A1* | 11/2023 | Liu | H04W 52/0248 |

FOREIGN PATENT DOCUMENTS

| | | | |
|---|---|---|---|
| CN | 112423237 | A | 2/2021 |
| WO | 2023050319 | A1 | 4/2023 |

OTHER PUBLICATIONS

International Search Report of the International Application No. PCT/CN2021/122196, mailed on May 25, 2022, with English translation provided by WIPO.

Written Opinion of the International Search Authority in the International Application No. PCT/CN2021/122196, mailed on May 25, 2022, with English translation provided by WIPO.

"3rd Generation Partnership Project; Technical Specification Group Radio Access Network; NR; Physical layer procedures for control (Release 16)", 3GPP TS 38.213, V16.6.0 (Jun. 2021).

* cited by examiner

WIRELESS COMMUNICATION METHOD, TERMINAL DEVICE AND NETWORK DEVICE

CROSS-REFERENCE TO RELATED APPLICATION

This is a continuation application of International Patent Application No. PCT/CN2021/122196, filed on Sep. 30, 2021, entitled "WIRELESS COMMUNICATION METHOD, TERMINAL DEVICE AND NETWORK DEVICE", the disclosure of which is hereby incorporated by reference in its entirety.

BACKGROUND

In a New Radio (NR) system, a unicast service and a Multicast Broadcast Service (MBS) may be supported. How to design a Band Width Part (BWP) timer (such as a BWP-inactivity timer) corresponding to the unicast service and/or MBS is an urgent problem to be solved.

SUMMARY

Embodiments of the present disclosure relate to the communication field, in particular to a method for wireless communication, a terminal device and a network device. A BWP timer is designed, which takes into account a continuity of data reception for the unicast service and MBS at the same time.

According to a first aspect, there is provided a method for wireless communication, which includes the following operations.

A terminal device receives a first signaling.

The first signaling includes first information and second information, the first information is used to configure a first timer corresponding to a band width part (BWP), and the second information is used to configure a second timer corresponding to a common frequency resource (CFR); or the first signaling includes third information, the third information is used to configure the first timer corresponding to the BWP and the second timer corresponding to the CFR.

According to a second aspect, there is provided a method for wireless communication, which includes the following operations.

A network device sends a first signaling to a terminal device.

The first signaling includes first information and second information, the first information is used to configure a first timer corresponding to a BWP, and the second information is used to configure a second timer corresponding to a CFR; or the first signaling includes third information, the third information is used to configure the first timer corresponding to the BWP and the second timer corresponding to the CFR.

According to a third aspect, there is provided a terminal device, including a processor and a memory. The memory is configured to store a computer program, and the processor is configured to call and execute the computer program stored in the memory to receive a first signaling. The first signaling includes first information and second information, the first information is used to configure a first timer corresponding to a band width part (BWP), and the second information is used to configure a second timer corresponding to a common frequency resource (CFR); or the first signaling includes third information, the third information is used to configure the first timer corresponding to the BWP and the second timer corresponding to the CFR.

According to a fourth aspect of the present disclosure, there is provided a network device, including a processor and a memory. The memory is configured to store a computer program, and the processor is configured to call and execute the computer program stored in the memory to send a first signaling to a terminal device. The first signaling includes first information and second information, the first information is used to configure a first timer corresponding to a band width part (BWP), and the second information is used to configure a second timer corresponding to a common frequency resource (CFR); or the first signaling includes third information, the third information is used to configure the first timer corresponding to the BWP and the second timer corresponding to the CFR.

According to the technical solutions of the first aspect and the second aspect, the network device may configure the first timer corresponding to the BWP and the second timer corresponding to the CFR simultaneously. The first timer may correspond to the unicast service or the MBS, and the second timer may correspond to the MBS, the first timer and the second timer are configured, which takes into account a continuity of data reception for the unicast service and MBS at the same time.

DETAILED DESCRIPTION

Figure 1:
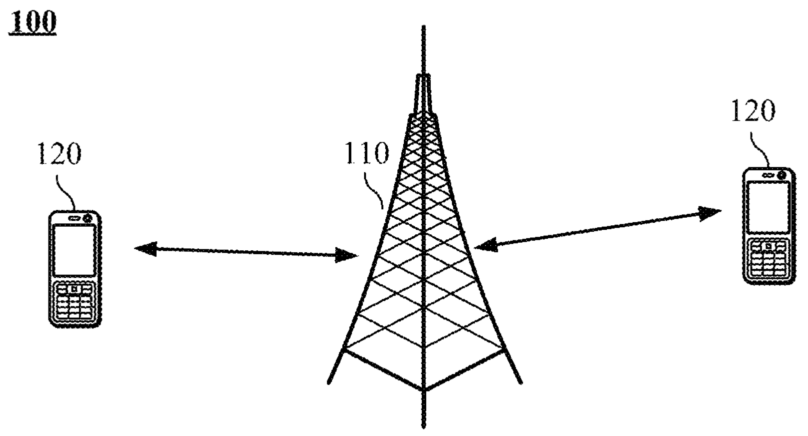
FIG. 1 is a schematic diagram of a communication system architecture to which embodiments of the present disclosure are applied.

The technical solution of the embodiments of the present disclosure will be described below in conjunction with the drawings in the embodiments of the present disclosure, and it will be apparent that the described embodiments are part of the embodiments of the present disclosure, but not all of them. Based on the embodiments in the present disclosure, all other embodiments obtained by those skilled in the art without making creative efforts fall within the scope of protection of the present disclosure.

The technical solution of the embodiments of the present disclosure may be applied to various communication systems. For example, a global system of mobile communication (GSM) system, a code division multiple access (CDMA) system, a wideband code division multiple access (WCDMA) system, a general packet radio service (GPRS), a long term evolution (LTE) system, an advanced long term evolution (LTE-A) system, a new radio (NR) system, an evolution system of NR system, an LTE-based access to unlicensed spectrum (LTE-U) system, an NR-based access to unlicensed spectrum (NR-U) system, a non-terrestrial networks (NTN) system, a universal mobile telecommunication system (UMTS), a wireless local area network (WLAN), an internet of things (IoT), a wireless fidelity (WiFi), a 5th-generation communication system or other communication systems.

Generally speaking, conventional communication systems support a limited number of connections and are easy to implement. However, with the development of communication technology, mobile communication systems will not only support a conventional communication, but also support, for example, a device to device (D2D) communication, a machine to machine (M2M) communication, a machine type communication (MTC), a vehicle to vehicle (V2V) communication, a vehicle to everything (V2X), etc. Embodiments of the present disclosure may also be applied to these communication systems.

In some embodiments, the communication system in the embodiments of the present disclosure may be applied to a carrier aggregation (CA) scenario, a dual connectivity (DC) scenario, and a standalone (SA) network distribution scenario.

In some embodiments, the communication system in the embodiments of the present disclosure may be applied to a unlicensed spectrum, where the unlicensed spectrum may also be considered as a shared spectrum. Optionally, the communication system in the embodiments of the present disclosure may also be applied to a licensed spectrum, where the licensed spectrum may also be considered as a non-shared spectrum.

Embodiments of the present disclosure are described in connection with a network device and a terminal device. The terminal device may be referred to as user equipment (UE), an access terminal, a subscriber unit, a subscriber station, a mobile station, a mobile platform, a remote station, a remote terminal, a mobile device, a user terminal, a terminal, a wireless communication device, a user agent, or a user device.

The terminal device may be a STATION (ST) in a WLAN, it may be a cellular phone, a cordless phone, a session initiation protocol (SIP) telephone, a wireless local loop (WLL) station, a personal digital assistant (PDA) device, a handheld device with wireless communication function, a computing device or other processing device connected to a wireless modem, an in-vehicle device, a wearable device, a next-generation communication system such as a terminal device in an NR network, or the terminal device in the future evolved public land mobile network (PLMN) network, etc.

In the embodiments of the present disclosure, the terminal device may be deployed on land, including indoor or outdoor, hand-held, wearable or in-vehicle. The terminal device may also be deployed on the water (such as ships, etc.). The terminal device may also be deployed on the air (such as airplanes, balloons and satellites, etc).

In the embodiments of the present disclosure, the terminal device may be a mobile phone, a pad, a computer with wireless transceiver function, a virtual reality (VR) terminal device, an augmented reality (AR) terminal device, a wireless terminal device in an industrial control, a wireless terminal device in a self-driving, a wireless terminal device in a remote medical, a wireless terminal device in a smart grid, a wireless terminal device in a transportation safety, a wireless terminal device in a smart city or smart home, a vehicle communication device, a wireless communication chip/application specific integrated circuit (ASIC)/System on Chip (SoC) etc.

By way of example and not limitation, in the embodiments of the present disclosure, the terminal device may also be a wearable device. A wearable device may also be called a wearable intelligent device, which is the general name of wearable devices developed by applying wearable technology to intelligently design daily wear, such as glasses, gloves, watches, clothing and shoes. The wearable device is a portable device that is worn directly on the body or integrated into the user's clothes or accessories. The wearable device is not only a kind of hardware device, but also realizes powerful functions through software support, data interaction and cloud interaction. Generalized wearable smart devices include full functions and large size, which may realize complete or partial functions without relying on smart phones, such as smart watches or smart glasses, and only focus on certain application functions, and the wearable smart devices need to be used in conjunction with other devices such as smart phones, such as various smart bracelets and smart jewelry for monitoring physical signs.

In the embodiments of the present disclosure, the network device may be a device for communicating with a mobile device, and the network device may be an access point (AP) in WLAN, a base transceiver station (BTS) in GSM or CDMA, a base station (NodeB, NB) in WCDMA, an evolutional node B (eNB or eNodeB) in LTE, a relay station or an access point, or an in-vehicle device, a wearable device, a network device or a base station (gNB) in NR network, a network device in future evolved PLMN network or a network device in NTN network, etc.

By way of example and not limitation, in the embodiments of the present disclosure, the network device may have mobility characteristics, for example, the network device may be a mobile device. In some embodiments, the network device may be a satellite or a balloon station. For example, the satellite may be a low earth orbit (LEO) satellite, a medium earth orbit (MEO) satellite, a geostationary earth orbit (GEO) satellite, a high elliptical orbit (HEO) satellite, and the like. In some embodiments, the network device may also be a base station arranged on land, water and the like.

In the embodiments of the present disclosure, the network device may provide services for a cell, the terminal device communicates with the network device through transmission resources (e.g. frequency domain resources, or spectrum resources) used by the cell, the cell may be a cell corresponding to a network device (e.g. a base station), the cell may belong to a macro base station or a base station corresponding to a small cell. The small cell may include a metro cell, a micro cell, a pico cell, a femto cell, etc. These small cells have the characteristics of small coverage and low transmission power, and are suitable for providing high-speed data transmission services.

Exemplarily, a communication system 100 applied in the embodiments of the present disclosure is illustrated in FIG. 1. The communication system 100 may include a network device 110, which may be a device that communicates with a terminal device 120 (or referred to as a communication terminal or terminal). The network device 110 may provide communication coverage for a particular geographic area and may communicate with terminal devices located within the coverage area.

FIG. 1 exemplarily illustrates one network device and two terminal devices. In some embodiments, the communication system 100 may include multiple network devices and other numbers of terminal devices may be included within the coverage of each network device, which is not limited by embodiments of the present disclosure.

In some embodiments, the communication system 100 may also include other network entities such as network controllers, mobility management entities and the like, which are not limited by the embodiments of the present disclosure.

It should be understood that a device having a communication function in a network/system in the embodiments of the present disclosure may be referred to as a communication device. Taking the communication system 100 illustrated in FIG. 1 as an example, the communication device may include a network device 110 and a terminal device 120 having a communication function, the network device 110 and the terminal device 120 may be specific devices described above and will not be described here. The communication device may also include other devices in the communication system 100 such as network controllers, mobility management entities and other network entities, which are not limited in the embodiments of the present disclosure.

It should be understood that the terms "system" and "network" of the present disclosure are often used interchangeably herein. In the present disclosure, the term "and/or" is used to describe an association relationship of associated objects, and represents that there may be three relationships. For example, A and/or B may represent the following three situations: independent existence of A, existence of both A and B and independent existence of B. In addition, the character "/" in the present disclosure generally represents that an "or" relationship is formed between the previous and next associated objects.

Terms used in the embodiments of the present disclosure are used only for explanation of specific embodiments of the present disclosure and are not intended to be limiting. Terms "first", "second", "third", "fourth", etc. in the description and claims of the present disclosure and the above drawings are used to distinguish different objects, and are not used to describe a particular order. Furthermore, the terms "including" and "having" and any variations thereof are intended to cover non-exclusive inclusion.

It should be understood that the reference to "indicate" in the embodiments of the present disclosure may be a direct indication, may be an indirect indication, or may indicate an association relationship. For example, A indicates B, which may mean that A directly indicates B, for example, B may be obtained through A. It may also mean that A indirectly indicates B, for example, A indicates C, and B may be obtained by C. It may also indicate that there is an association relationship between A and B.

In the description of embodiments of the present disclosure, the term "correspond" may mean that there is a direct correspondence or an indirect correspondence relationship between the two, may also mean that there is an association relationship between the two, may also be a relationship between indication and being indicated, configuration and being configured, etc.

In the embodiments of the present disclosure, the "predefined" or "pre-configured" may be implemented by pre-storing corresponding codes, tables, or other manners that may be used to indicate relevant information in devices (e.g., including terminal devices and network devices), the specific implementation of which is not limited by the present disclosure. For example, predefined may refer to what is defined in the protocol.

In the embodiments of the present disclosure, the "protocol" may refer to standard protocols in the communication field, such as an LTE protocol, an NR protocol, and related protocols applied in future communication systems, which are not limited herein.

In order to facilitate understanding of the technical solution of the embodiments of the present disclosure, the technical solution of the present disclosure will be described in detail by specific embodiments below. The following related technologies may be combined with the technical solution of the embodiments of the present disclosure arbitrarily as an optional solution, all of which belong to the protection scope of the embodiments of the present disclosure. Embodiments of the present disclosure include at least some of the following.

At present, with people's pursuit of speed, delay, high-speed mobility and energy efficiency, as well as the diversity and complexity of services in future life, 5G communication network has been introduced. The main application scenarios of 5G include an enhanced mobile broadband (eMBB), an ultra-reliable and low latency communication (URLLC) and a massive machine-type communication (mMTC).

The eMBB still aims at acquisition of multimedia content, services and data for users, and its demand is growing rapidly. On the other hand, eMBB may be deployed in different scenarios, such as indoor, urban, rural, whose capabilities and requirements are quite different, and thus it cannot be generalized and must be analyzed in detail in combination with specific deployment scenarios. Typical applications of URLLC include: an industrial automation, power automation, a telemedicine operation (surgery), a traffic safety guarantee and so on. The typical characteristics of mMTC include: a high connection density, a small data volume, a delay-insensitive services, a low cost of modules and a long service life.

NR may also be deployed independently. In the 5G network environment, in order to reduce the radio signaling and restore wireless connection and data service quickly, a new radio resource control (RRC) state, that is, RRC inactive (RRC_INACTIVE) state is introduced in 5G. The RRC_INACTIVE state is different from the RRC idle (RRC_IDLE) state and the RRC active (RRC_ACTIVE) state.

RRC_IDLE: in this state, mobility is cell selection and cell reselection based on the terminal device, paging is initiated by a core network (CN), and paging areas are configured by the CN. There is no terminal device access stratum (AS) context on the base station side. There is no RRC connection.

RRC_CONNECTED: in this state, RRC connection exists, and the terminal device AS context exists on the base station side and the terminal device side. The network side knows that the location of the terminal device is at a cell-specific. Mobility is the mobility controlled by the network side. Unicast data may be transmitted between the terminal and the base station.

RRC_INACTIVE: in this state, mobility is cell selection and cell reselection based on the terminal device, a connection exists between CN and NR (CN-NR), and the terminal device AS context exists on a certain base station. Paging is triggered by a Radio Access Network (RAN), RAN-based paging areas are managed by the RAN, and network side knows that the location of the terminal device is at an RAN-based paging area level.

Figure 2:
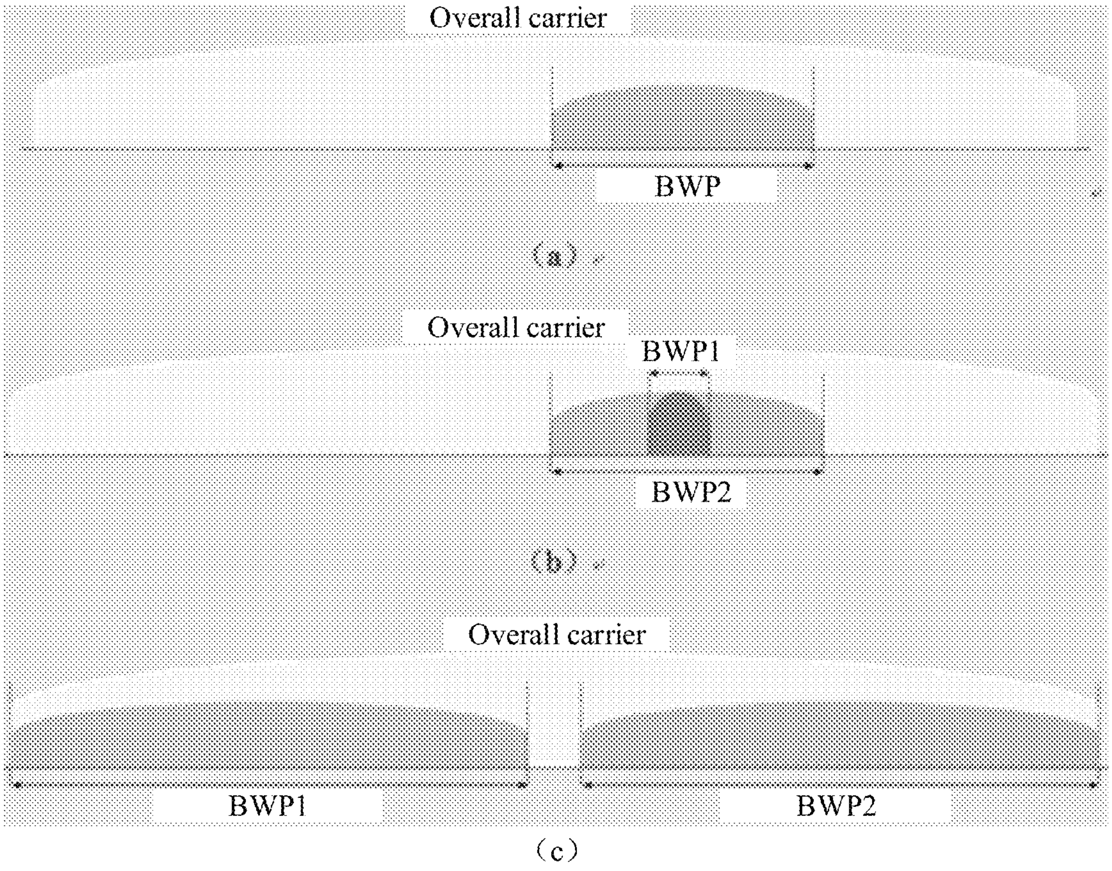
FIG. 2 is a schematic diagram of a BWP provided by the present disclosure.

In 5G, the maximum channel bandwidth may be 400 MHZ (such as a wideband carrier), which is very large compared with a maximum bandwidth of LTE of 20 M. If the terminal device keeps operating on the wideband carrier, the power consumption of the terminal device is very large. Therefore, a Radio Frequency (RF) bandwidth of the terminal device may be adjusted according to an actual throughput of the terminal device. In addition, a BWP is introduced to optimize the power consumption of the terminal device. For example, if the speed requirement for the terminal device is very low, a smaller bandwidth may be configured for the terminal device (as illustrated in (a) of FIG. 2), and if the speed requirement for the terminal device is very high, a larger bandwidth may be configured for the terminal device (as illustrated in (b) of FIG. 2). If the terminal device supports high rate or operates in a Carrier Aggregation (CA) mode, multiple BWPs may be configured for the terminal device (as illustrated in (c) of FIG. 2). Another purpose of BWP is to trigger a coexistence of multiple basic numerologies in a cell.

In some embodiments, the terminal in the RRC idle state or the RRC inactive state resides on an initial BWP, which is visible to the terminal in the RRC idle state or the RRC inactive state. In this BWP, information such as Master Information Block (MIB), Remaining System Information (RMSI), Other System Information (OSI) and paging may be obtained.

In order to better understand the embodiments of the present disclosure, the MBMS and a Single Cell Point To Multipoint (SC-PTM) system in the LTE related to the present disclosure is explained.

A Multimedia Broadcast Multicast Service (MBMS) is a technology that transmits data from one data source to multiple user equipment by sharing network resources. MBMS can utilize network resources effectively while providing multimedia services, and realize multimedia service broadcast and multicast at a high speed (such as 256 kbps).

Due to a lower spectrum efficiency of the MBMS, it is not enough to carry and support the operation of mobile and TV services effectively. A enhanced MBMS (E-MBMS) introduces a concept of Single Frequency Network (SFN), which uses a unified frequency to send data in all cells at the same time, but it is necessary to ensure the synchronization among cells. This method can improve the overall signal-to-noise ratio distribution of the cell greatly, and the spectrum efficiency will be greatly improved accordingly. In addition, the service broadcast and multicast are achieved based on the Internet Protocol (IP) multicast protocol.

In the LTE/LTE-A, there is only a broadcast bearer mode in the MBMS, but no multicast bearer mode.

The reception of the MBMS service is suitable for UE in the RRC connected state or the RRC idle state.

SC-PTM is based on an MBMS network architecture, and a Multi-cell/multicast Coordination Entity (MCE) decides whether to use an SC-PTM transmission manner or a Multimedia Broadcast multicast service Single Frequency Network (MBSFN) transmission manner.

Figure 3:
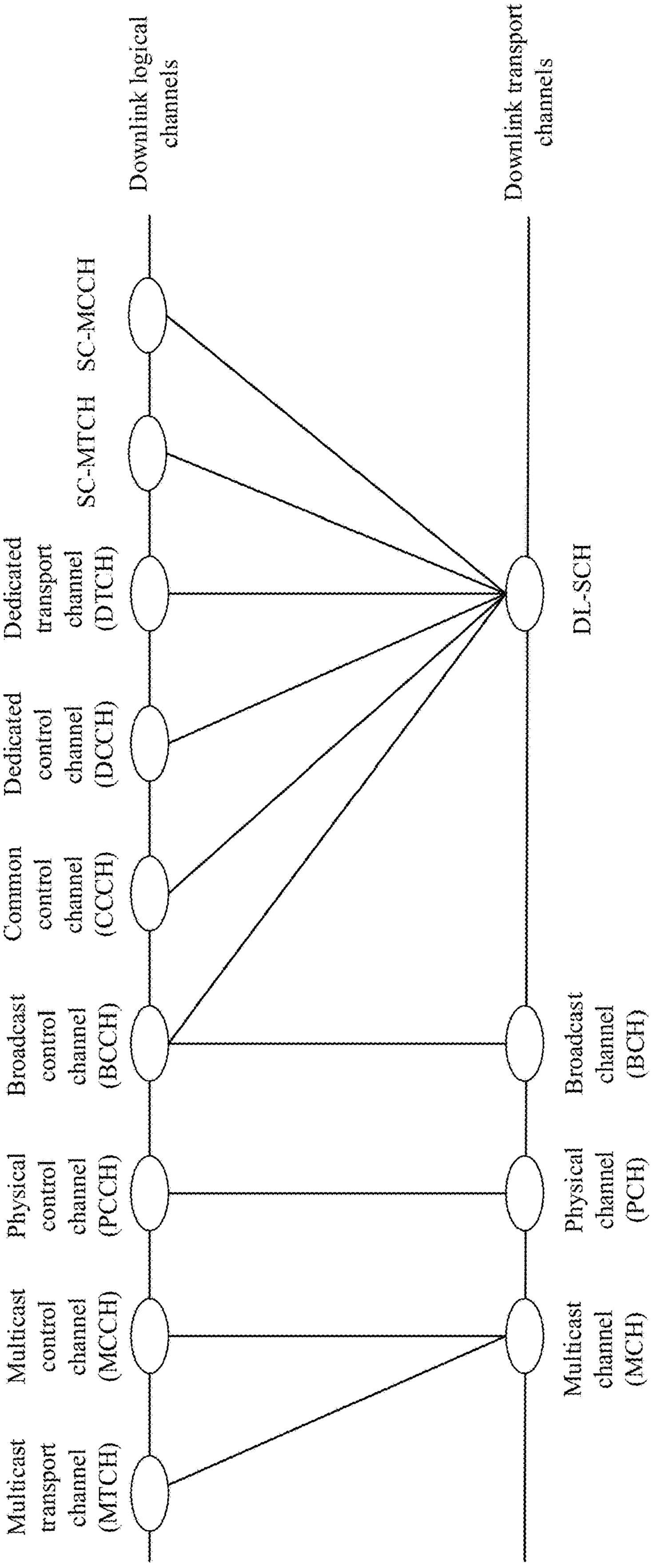
FIG. 3 is a schematic diagram of a Single Cell Point To Multipoint (SC-PTM) channel and a mapping thereof provided by the present disclosure.

Specifically, as illustrated in FIG. 3, a Single Cell Multicast Control Channel (SC-MCCH) and a Single Cell Multicast Transport Channel (SC-MTCH) are introduced in the SC-PTM. A Logical Channel Identity (LCID) of the SC-MCCH is 11001, and an LCID of the SC-MTCH is 11001. The SC-MCCH and the SC-MTCH may be mapped to a Downlink Shared Channel (DL-SCH) transport channel, i.e., a Physical Downlink Shared Channel (PDSCH) physical channel. The SC-MCCH and the SC-MTCH do not support Hybrid Automatic Repeat reQuest (HARQ) operations.

A new type of System Information Block (SIB), i.e., SIB20 is introduced in the SC-PTM to transmit configuration information of the SC-MCCH, and there is only one SC-MCCH in one cell. The configuration information includes a modification period of the SC-MCCH, a repetition period, and radio frame and sub-frame configuration information.

A radio frame scheduled by the SC-MCCH: system frame number (SFN) mod MCCH Repeatition Period (mcch-RepetitionPeriod)=MCCH offset (mcch-Offset).

A subframe scheduled by the SC-MCCH is indicated by a field of an SC-MCCH subframe (sc-mcch-Subframe).

The SC-MCCH transmits only one message, i.e., SC-PTM configuration (SC-PTMConfiguration), which is used to configure configuration information for SC-PTM. A new Radio Network Temporary Identity (RNTI), i.e., a Single Cell RNTI (SC-RNTI) (fixed value as FFFC) is introduced to identify scheduling information of the SC-MCCH on a Physical Downlink Control Channel (PDCCH).

A new RNTI, i.e., a Single Cell Notification RNTI (SC-N-RNTI) (fixed value as FFFB) is introduced in the SC-PTM to identify a PDCCH of a change notification of the SC-MCCH. The change notification is indicated by one of eight bits in a Downlink Control Information Format (DCI Format) 1C. A boundary of a modification period is defined as SFN mod m=0, where m is the modification period configured in the SIB20 (sc-mcch-ModificationPeriod).

In the NR, the Radio Link Control (RLC) Acknowledged Mode (AM) has a feedback mechanism of an Automatic Repeat reQuest (ARQ). The receiving end sends an RLC status report to feedback that the receiving status of the RLC packet is an Acknowledgement (ACK) or a Negative Acknowledgement (NACK). The sending end may repeatedly transmit the RLC packet with the sequence number (SN) in the feedback NACK.

In order to better understand the embodiments of the present disclosure, the downlink BWP configuration related to the present disclosure is explained.

The downlink BWP is configured by a BWP-Downlink parameter, as shown in the first segment of ASN.1 code below, which includes bwp-Id identifying the identification (ID) of the current BWP, and bwp-common used for configuring a common parameter of the downlink BWP. As shown in the second segment of ASN.1 code below, genericParameters in BWP-DownlinkCommon is used for configuring a frequency domain starting point of the downlink BWP and the number of contained physical resource blocks (PRB) in the downlink BWP. For a terminal specific unicast BWP, the bwp-Dedicated parameter in the BWP-Downlink would configure downlink receiving parameters on the downlink BWP, and as shown in the third segment of ASN.1 code below, the downlink receiving parameters at least include pdcch-Config, pdsch-Config and sps-Config. As shown in the second segment of ASN.1 code, pdcch-Config is used to indicate a PDCCH sending manner on the downlink BWP, pdsch-Config is used to indicate a PDSCH sending manner on the downlink BWP, and sps-Config is used to indicate a Semi-Persistent Scheduling (SPS) configuration on the downlink BWP.

The first segment of ASN.1 code is as follows:

```
BWP-Downlink ::=                    SEQUENCE {
   bwp-Id                              BWP-Id,
   bwp-Common                              BWP-DownlinkCommon
OPTIONAL,   -- Cond SetupOtherBWP
   bwp-Dedicated                         BWP-DownlinkDedicated
OPTIONAL,   -- Cond SetupOtherBWP
   ...
}
The second segment of ASN.1 code is as follows:
BWP-DownlinkCommon ::=               SEQUENCE {
   genericParameters                  BWP,
   pdcch-ConfigCommon            SetupRelease { PDCCH-ConfigCommon }
OPTIONAL,   -- Need M
   pdsch-ConfigCommon            SetupRelease { PDSCH-ConfigCommon }
OPTIONAL,  -- Need M
   ...
}
The third segment of ASN.1 code is as follows:
BWP-DownlinkDedicated ::=          SEQUENCE {
   pdcch-Config                    SetupRelease { PDCCH-Config }
OPTIONAL,   -- Need M
   pdsch-Config                    SetupRelease { PDSCH-Config }
OPTIONAL,   -- Need M
   sps-Config                              SetupRelease { SPS-Config }
OPTIONAL,   -- Need M
   radioLinkMonitoringConfig                         SetupRelease
{ RadioLinkMonitoringConfig }                 OPTIONAL,   -- Need M
   ...,
```

In order to better understand the embodiments of the present disclosure, the NR MBS group scheduling manner related to the present disclosure is explained.

The NR MBS needs to support one-to-multiple multicast transmission. In this transmission mode, the base station needs to schedule a common PDSCH by sending a common downlink control channel, and the common PDCCH and the common PDSCH are sent in a Common Frequency Resource (CFR). In some embodiments, there are two alternative CFR configuration manners:

First manner: CFR is configured as an MBS specific BWP, the MBS specific BWP is associated with a terminal specific unicast BWP, and a sub-carrier spacing and cyclic prefix configured on the CFR are the same as those configured on the terminal specific unicast BWP.

Second manner: CFR is configured as a continuous plurality of PRBs within the range of terminal specific unicast BWP.

The advantage of the first manner is that CFR may use BWP signaling configuration, which is beneficial to reduce a standard workload. However, the problem is that since CFR is defined as the BWP, if the terminal is required to receive unicast in a dedicated unicast BWP and multicast in the CFR at the same time, it means that the terminal needs to receive downlink transmission on two BWPs at the same time, but the terminal is only capable of receiving downlink transmission on one BWP at a given time. In addition, even if the terminal receives unicast and multicast at different times, BWP switching delay will be introduced because the unicast and multicast are located in different BWPs. The second manner can avoid the problem of BWP switching. However, because CFR is a continuous plurality of PRBs in this manner, the current signaling configuration based on BWP cannot be followed, and a configuration manner of CFR resource range and uplink and downlink transmission parameters needs to be redesigned, which has a great impact on the standard.

In addition, since the common PDCCH for scheduling the common PDSCH needs to be sent to a plurality of receiving terminals simultaneously, in order to ensure that the number of bits of the common Downlink Control Information (DCI) carried in the common PDCCH determined by the plurality of terminals is the same, the terminals cannot determine the number of bits of the common DCI according to the configuration of a respective terminal specific unicast BWP. In addition, since the number of PRBs of the CFR may be different from the initial BWP or control resource set #0 (CORESET #0) currently configured by the terminals, the terminals cannot determine the number of bits of the common DCI through the initial BWP or CORESET #0. Therefore, inevitably, the number of bits of the common DCI may be different from the number of bits of the DCI received by the terminal in the UE Search Space (USS) or the Common Search Space (CSS). Then, in order to reduce an implementation complexity of the terminal, at present, the terminal may only receive 4 pieces of DCI with different bits at most in a cell, among which the number of DCI bits scrambled by a Cell Radio Network Temporary Identity (C-RNTI) does not exceed 3.

Figure 4:
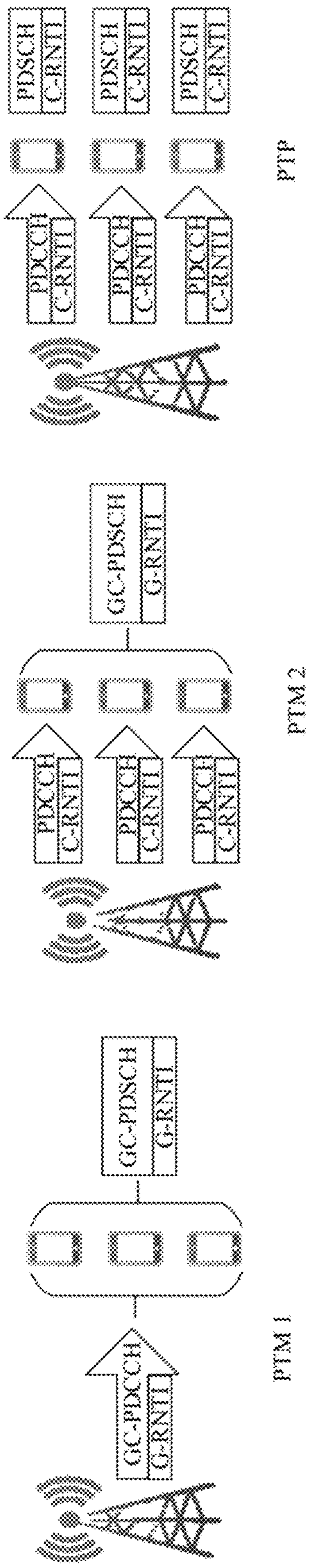
FIG. 4 is a schematic diagram of an MBS downlink scheduling manner provided by the present disclosure.

In some embodiments, as illustrated in FIG. 4, there may be three manners to schedule transmission of MBS, where PTM1 and Point to Point (PTP) transmission are already supported. A group-common PDCCH (GC-PDCCH) or a group-common PDSCH (GC-PDSCH) refers to PDCCH/PDSCH transmitted by the base station on a set of time-frequency resources, which may be received by multiple UE in the same group. A scheduling manner of Point to Multi-point (PTM) transmission mentioned in the present solution refers to PTM1.

PTM 1: for a plurality of UE of the same group in the connected state, a GC-PDCCH is used to schedule a GC-PDSCH, where a Cyclic Redundancy Check (CRC) of the GC-PDCCH is scrambled by using a group-common RNTI (G-RNTI), and the GC-PDSCH is scrambled by using the same G-RNTI.

PTM 2: for a plurality of UE of the same group in the connected state, a GC-PDSCH is scheduled by each UE using a UE specific PDCCH, where a CRC of the UE specific PDCCH is scrambled by using a UE specific RNTI (i.e. C-RNTI), and the GC-PDSCH is scrambled by using a G-RNTI.

PTP: for connected UE, a UE specific PDCCH is used by each UE for scheduling a UE specific PDSCH, where a CRC of a UE specific PDCCH is scrambled by a UE specific RNTI (i.e. C-RNTI), and a UE specific PDSCH is scrambled by a UE specific RNTI (i.e. C-RNTI).

In some embodiments, a retransmission mechanism, based on Hybrid Automatic Repeat request Acknowledgement (HARQ-ACK) feedback, of the MBS in the connected state supports the following manners:

$$\text{First manner: initial transmission of } PTM1 + \text{retransmission of } PTM1;$$

$$\text{Second manner: initial transmission of } PTM1 + \text{retransmission of } PTP.$$

In order to better understand the embodiments of the present disclosure, the manner of using HARQ process ID (HPID) for NR MBS multicast and unicast related to the present disclosure is explained.

A HPID (HARQ process ID: 0~15) of the system is shared between the multicast and unicast, and how to allocate HPID is decided by the implementation of the base station.

The HPID and a New Data Indicator (NDI) together determine whether a currently transmitted Transmission block (TB) is initially transmitted or retransmitted. For example, the currently received HPID #1 corresponds to NDI=0 carried in DCI.

Compared with NDI=1 corresponding to the previous received HPID #1, it may be determined that the currently received TB belongs to an initial transmission of a new TB. The UE will empty the data information of the previous TB stored in a cache, and then store the initial transmission of the newly received TB and a potential received retransmission in the cache for soft merging.

Compared with NDI-0 corresponding to the previous received HPID #1, it may be determined that the currently received TB belongs to a retransmission.

In order to better understand the embodiments of the present disclosure, technical problems solved in the present disclosure are explained.

At present, there are only a unicast service reception and a downlink (DL) BWP supporting the unicast service reception, and DL BWP is UE specific BWP. When a DL BWP is activated, the BWP-inactivity timer (BWP-InactivityTimer) is started and counting is started. If the BWP-InactivityTimer expires, the UE is switched from the currently activated BWP1 to BWP2. If a UE specific PDCCH is received during this period, then BWP-InactivityTimer is re-started, that is, counting is restarted. In this way, the duration for residing on the activated BWP and receiving unicast service data is extended.

Figure 5:
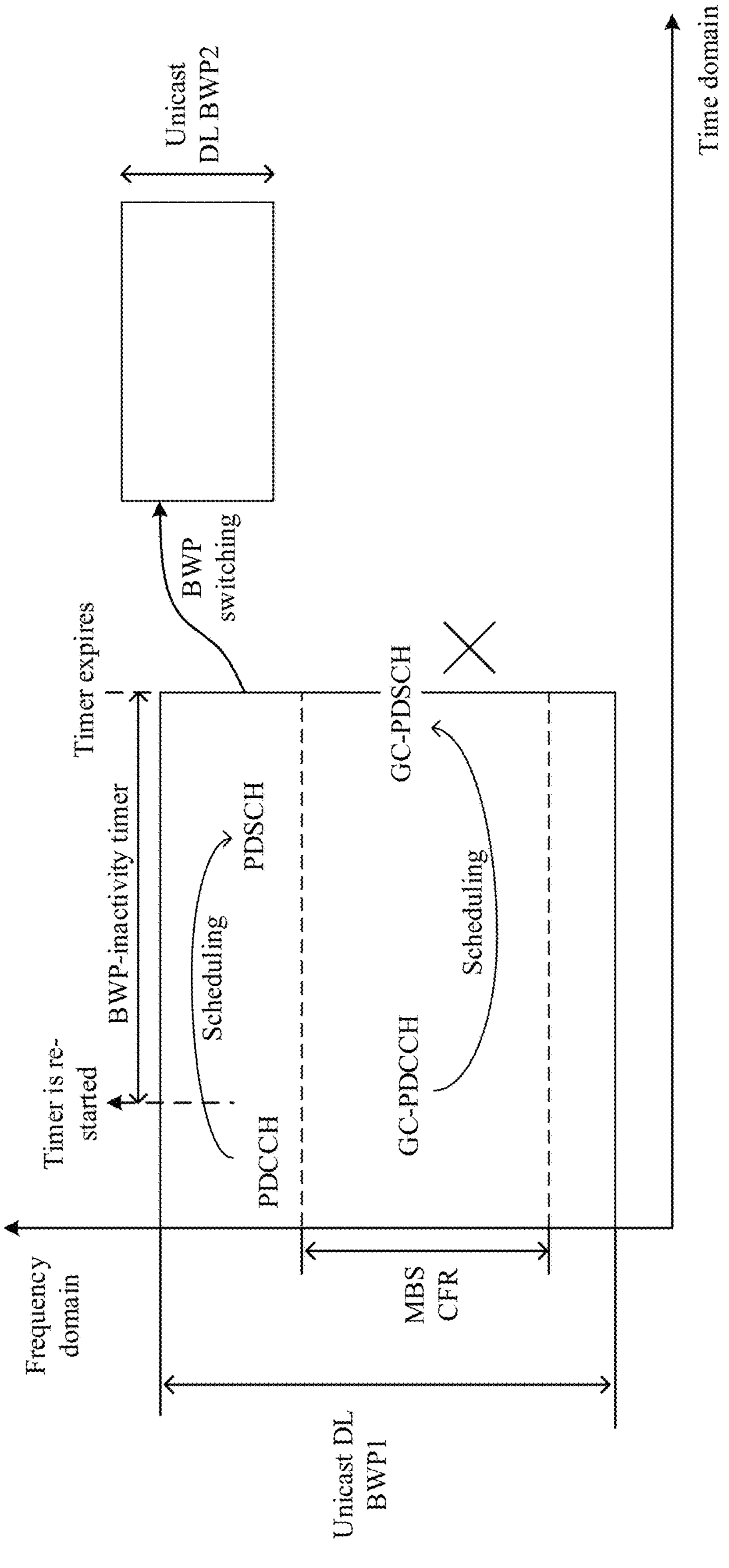
FIG. 5 is a schematic diagram of a problem in a design for a BWP timer provided by the present disclosure.

The current design has the following two disadvantages:

First disadvantage: the current design is only effective for unicast, and an MBS is not considered. When the UE receives the GC-PDCCH, the timer will not be re-started, which is likely to cause the timer to just expire when UE receives the GC-PDSCH scheduled by this GC-PDCCH, and then the BWP for UE is switched, resulting in interruption of MBS reception, as illustrated in FIG. 5.

Second disadvantage: no matter unicast PDSCH or GC-PDSCH of MBS, the BWP timer may expire when receiving a longer PDSCH. At this time, if BWP switching is performed on the UE, it will lead to interruption of PDSCH reception.

Based on the above problems, in the present disclosure, a BWP timer is designed, which takes into account a continuity of data reception for the unicast service and MBS at the same time, so that the data reception would not be interrupted due to expiration of the BWP timer and the BWP switching. In this way, the unicast service and MBS are not only supported at the same time, but also the reliability of s system is improved.

The technical solution of the present disclosure will be described in detail by specific embodiments below.

Figure 6:
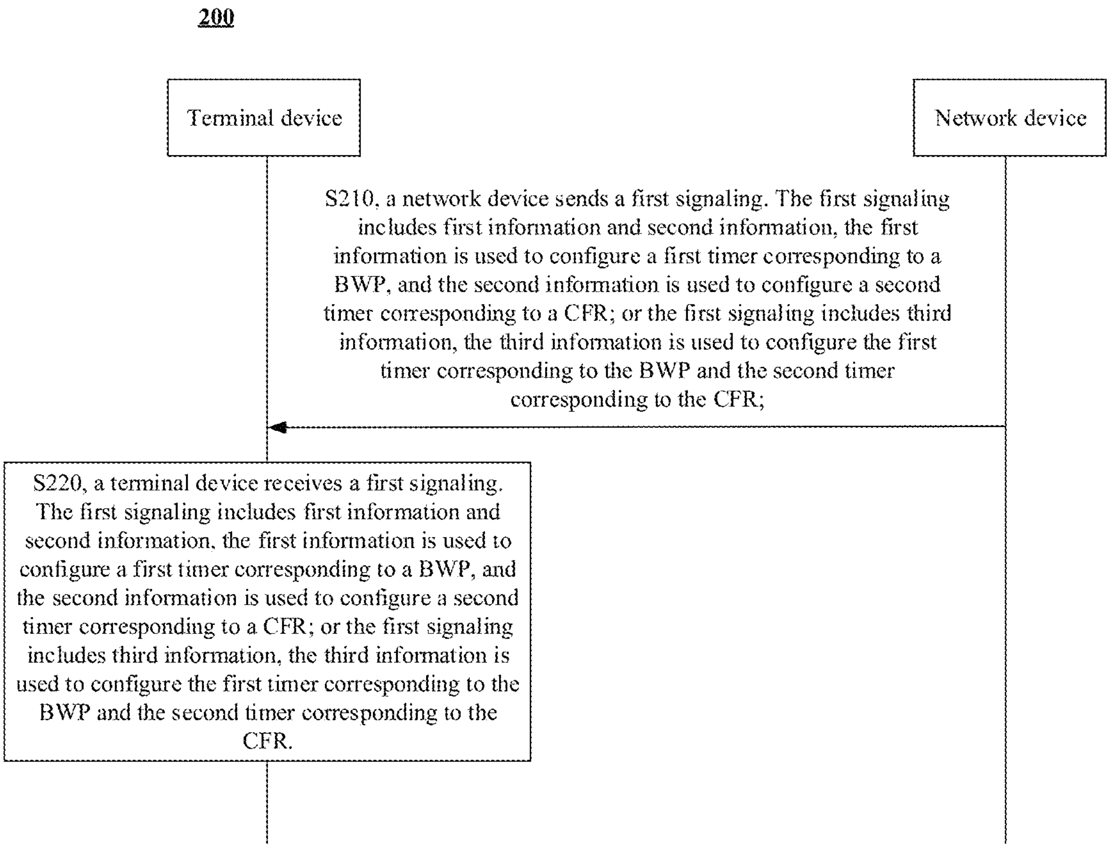
FIG. 6 is a schematic interaction flowchart of a method for wireless communication according to an embodiment of the present disclosure.

FIG. 6 is a schematic interaction flowchart of a method for wireless communication 200 according to an embodiment of the present disclosure. As illustrated in FIG. 6, the method for wireless communication 200 may include at least some of the following operations.

At S210, a network device sends a first signaling. The first signaling includes first information and second information, the first information is used to configure a first timer corresponding to a band width part (BWP), and the second information is used to configure a second timer corresponding to a common frequency resource (CFR); or the first signaling includes third information, the third information is used to configure the first timer corresponding to the BWP and the second timer corresponding to the CFR.

At S220, a terminal device receives a first signaling. The first signaling includes first information and second information, the first information is used to configure a first timer corresponding to a BWP, and the second information is used to configure a second timer corresponding to a CFR; or the first signaling includes third information, the third information is used to configure the first timer corresponding to the BWP and the second timer corresponding to the CFR.

In the embodiments of the present disclosure, the first timer may correspond to an MBS or a unicast service. The second timer may correspond to an MBS. That is, in the embodiments of the present disclosure, a first timer and a second timer are configured, which takes into account a continuity of data reception for the unicast service and MBS at the same time, so that the data reception would not be interrupted due to expiration of the BWP timer and the BWP switching. In this way, the unicast service and MBS are not only supported at the same time, but also the reliability of a system is improved.

In the embodiments of the present disclosure, “timer” may also be referred to as “clock” or “counter”, which is not limited herein.

In some embodiments, the MBS described in the embodiments of the present disclosure also may be an MBMS service, which is not limited in this application.

In some embodiments, the application may be applied to a unicast service transmission system in addition to broadcast and multicast systems.

In some embodiments, the first timer corresponding to the BWP may be one or more, that is, the network device may configure one or more first timers, and different first timers correspond to the same type of service, but may correspond to different configuration parameters of the service. For example, different first timers are used for services with different delay requirements. Only one first timer is used as an example in the present disclosure, and other first timers are similar and will not be repeated here.

In some embodiments, the second timers corresponding to the CFR may be one or more, that is, the network device may configure one or more second timers, and different second timers correspond to the same type of service, but may correspond to different configuration parameters of the service. For example, different second timers are used for services with different delay requirements. Only one second timer is used as an example in the present disclosure, and other second timers are similar and will not be repeated here.

In some embodiments, when the first information is used to configure the first timer and the second information is used to configure the second timer, the first timer is configured based on a BWP of a unicast service, and the second timer is configured based on a BWP of an MBS, or the second timer is configured based on a CFR of the MBS.

For example, the first information may be one or more elements in the first signaling, may be one or more fields in the first signaling, or may be one or more regions in the first signaling.

For example, the second information may be one or more elements in the first signaling, may be one or more fields in the first signaling, or may be one or more regions in the first signaling.

In some embodiments, when the third information is used to configure the first timer and the second timer, the first timer and the second timer are configured based on a same downlink BWP.

Specifically, for example, the third information may be one or more elements in the first signaling, may be one or more fields in the first signaling, or may be one or more regions in the first signaling.

In some embodiments, the first signaling may include, but is not limited to, at least one of the following:

an RRC signaling, SCI, a Media Access Control Control Element (MAC CE), a broadcast message.

In some embodiments, the BWP is a terminal device specific downlink BWP (DL BWP) activated by a unicast service, or the BWP is a group-common CFR (GC-CFR) activated by an MBS, or the BWP is a group-common MBS (GC-MBS) specific BWP activated by the MBS.

In some embodiments, the CFR includes part of resources in a terminal device specific downlink BWP on a frequency domain. That is, the terminal device specific downlink BWP includes the CFR. In this case, the CFR is not a BWP, but a frequency domain bandwidth attached to the BWP, and all other parameters of the CFR are consistent with the BWP, except that the timer defined in the present disclosure (for example, the BWP corresponds to a first timer and the CFR corresponds to a second timer) are inconsistent.

In some embodiments, the CFR includes part or all of resources in an MBS specific BWP on the frequency domain. That is, the CFR is an MBS specific BWP for receiving the MBS. At this time, a configuration on the CFR and configuration parameters of the terminal device specific downlink BWP are independent of each other, that is, they may be the same or different.

In some embodiments, a duration of the first timer and a duration of the second timer may be the same or different. For example, the duration of the first timer is the same as the duration of the second timer. For another example, the duration of the first timer is longer than the duration of the second timer. For another example, the duration of the first timer is smaller than the duration of the second timer.

In some embodiments, when the first timer or the second timer expires, the terminal device is switched from the BWP to another BWP. That is, when any one of the first timer and the second timer expires, the terminal device is switched from the currently activated BWP (i.e., the BWP corresponding to the first timer) to another BWP.

In some embodiments, when both the first timer and the second timer expire, the terminal device is switched from the BWP to another BWP. That is, when both the first timer and the second timer expire, the terminal device is switched from the currently activated BWP (i.e. the BWP corresponding to the first timer) to another BWP.

In some embodiments, when a timer that expires later among the first timer and the second timer times out, the terminal device is switched from the BWP to another BWP. That is, when the timer that expires later among the first timer and the second timer times out, the terminal device is switched from the currently activated BWP (i.e. the BWP corresponding to the first timer) to another BWP.

In some embodiments, when a timer that expires earlier among the first timer and the second timer times out, the terminal device is switched from the BWP to another BWP. That is, when the timer that expires earlier among the first timer and the second timer times out, the terminal device is switched from the currently activated BWP (i.e. the BWP corresponding to the first timer) to another BWP.

In some embodiments, the first timer and the second timer may operate in a first manner or a second manner.

The first manner is to end uniformly: all timers that have been started at present expire, and the terminal device is switched from the currently activated BWP to another BWP. Expiration times of the first timer and the second timer are different, and both the first timer and the second timer work according to an expiration time of a timer that expires at the latest.

The second manner is to end individually: when one of the all timers that have been started at present startedexpires, a service (unicast or MBS) associated with this timer is stopped receiving.

In some embodiments, the first timer is started when the BWP is activated, and the first timer is re-started after the terminal device has received a terminal device specific PDCCH on the BWP. Optionally, the terminal device specific PDCCH is used to schedule a unicast service, or the terminal device specific PDCCH is used to schedule an MBS.

In some embodiments, the second timer is started when the CFR is activated, and the second timer is re-started after the terminal device has received a GC-PDCCH on the CFR. Optionally, the group-common PDCCH (GC-PDCCH) is configured to schedule an MBS.

In some embodiments, the first timer and the second timer are started when the BWP is activated, the first timer is re-started after the terminal device has received the terminal device specific PDCCH on the BWP, and the second timer is re-started after the terminal device has received the GC-PDCCH on the CFR.

Specifically, for example, the BWP contains the CFR, which is activated by default when the BWP is activated. That is, both the first timer and the second timer are started when the BWP is activated.

In some embodiments, the GC-PDCCH is used to schedule an MBS.

In some embodiments, the terminal device specific PDCCH is used to schedule a unicast service, or the terminal device specific PDCCH is used to schedule an MBS.

Figure 7:
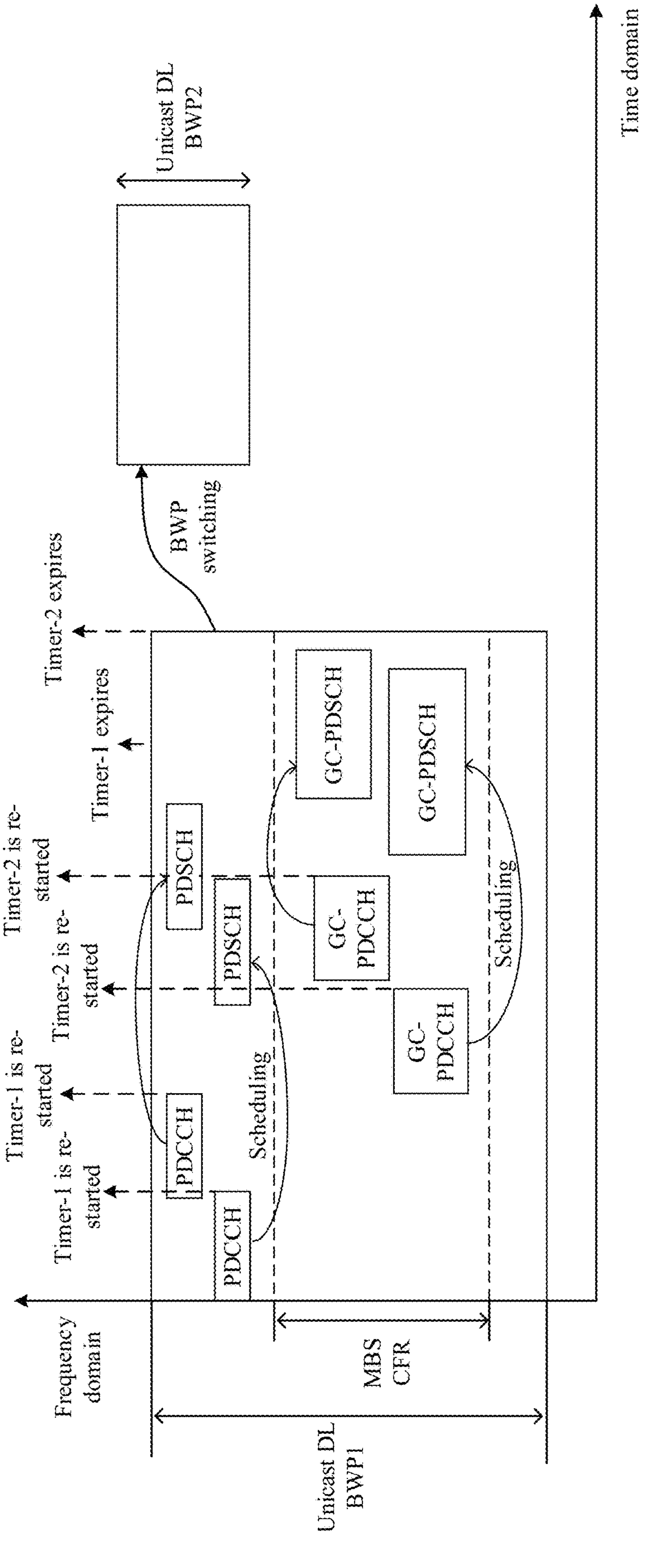
FIG. 7 is a schematic diagram of re-starting a timer provided by an embodiment of the present disclosure.

In some embodiments, the network device configures timer 1 corresponding to a unicast DL BWP1 and timer 2 corresponding to an MBS CFR by the first signaling, as illustrated in FIG. 7, the unicast DL BWP1 includes the MBS CFR, timer 1 and timer 2 are started when the unicast DL BWP1 is activated, timer 1 is re-started after terminal device has received the PDCCH (such as a terminal device specific PDCCH) on the unicast DL BWP1, timer 2 is re-started after the terminal device has received the GC-PDCCH on the MBS CFR, and the terminal device is switched from the unicast DL BWP1 to the unicast DL BWP2 when timer 2 (compared with timer 1, timer 2 expires later) expires.

In some embodiments, the first timer is paused or suspended when the terminal device receives a terminal device specific PDSCH on the BWP, and the first timer resumes operation after the terminal device specific PDSCH has been completely received.

In some embodiments, the second timer is paused or suspended when the terminal device receives a GC-PDSCH on the CFR, and the second timer resumes operation after the GC-PDSCH has been completely received.

In some embodiments, the terminal device specific PDSCH corresponds to a unicast service, or the terminal device specific PDSCH corresponds to an MBS.

In some embodiments, the GC-PDSCH corresponds to an MBS.

In some embodiments, a PDSCH for scheduling the unicast service is scrambled by using the C-RNTI; and/or, the UE specific PDSCH for scheduling the MBS is scrambled by using the C-RNTI.

In some embodiments, a GC-PDSCH for scheduling the MBS is scrambled by using the group-common RNTI (G-RNTI); and/or, the UE specific PDSCH for scheduling the MBS is scrambled by using the C-RNTI.

Figure 8:
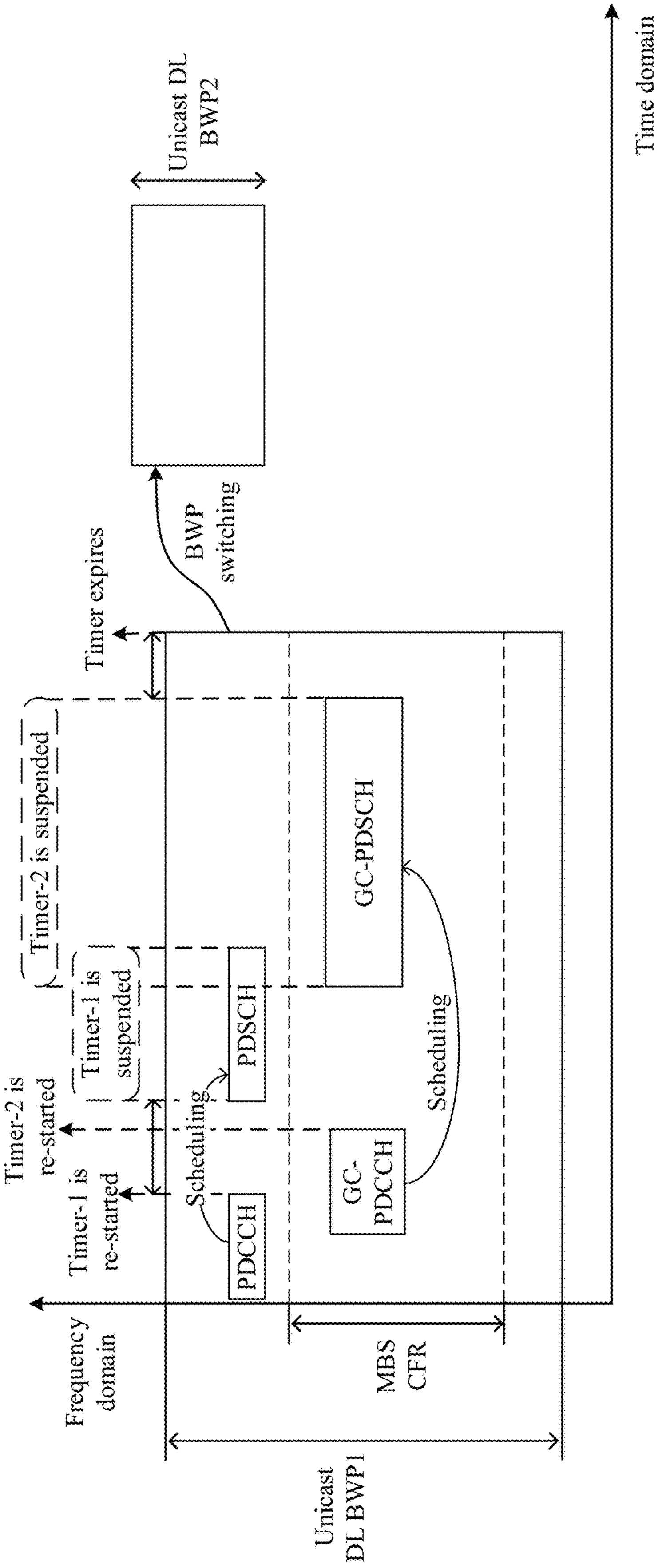
FIG. 8 is a schematic diagram of re-starting and suspending a timer provided by an embodiment of the present disclosure.

In some embodiments, the network device configures timer 1 corresponding to a unicast DL BWP1 and timer 2 corresponding to an MBS CFR by the first signaling, as illustrated in FIG. 8, the unicast DL BWP1 includes the MBS CFR, timer 1 and timer 2 are started when the unicast DL BWP1 is activated, timer 1 is re-started after terminal device has received the PDCCH (such as a terminal device specific PDCCH) on the unicast DL BWP1, timer 1 is suspended when terminal device receives a PDSCH scheduled by the PDCCH (such as terminal device specific PDSCH) on the unicast DL BWP1, and timer 1 resumes operation after the PDSCH reception has been completely received. Timer 2 is re-started after the terminal device has received the GC-PDCCH on MBS CFR, timer 2 is suspended when the terminal device receives a GC-PDSCH scheduled by the GC-PDCCH on the MBS CFR, and timer 2 resumes operation after the GC-PDSCH has been completely received. The terminal device is switched from the unicast DL BWP1 to unicast DL BWP2 when the timer (timer 1 or timer 2) expires.

Therefore, in the embodiments of the present disclosure, the network device may configure the first timer corresponding to the BWP and the second timer corresponding to the CFR simultaneously. Since the first timer may correspond to the unicast service or the MBS, and the second timer may correspond to the MBS, the first timer and the second timer are configured, which takes into account a continuity of data reception for the unicast service and MBS at the same time, so that the data reception would not be interrupted due to expiration of the BWP timer and the BWP switching. In this way, the unicast service and MBS are not only supported at the same time, but also the reliability of a system is improved.

Figure 9:
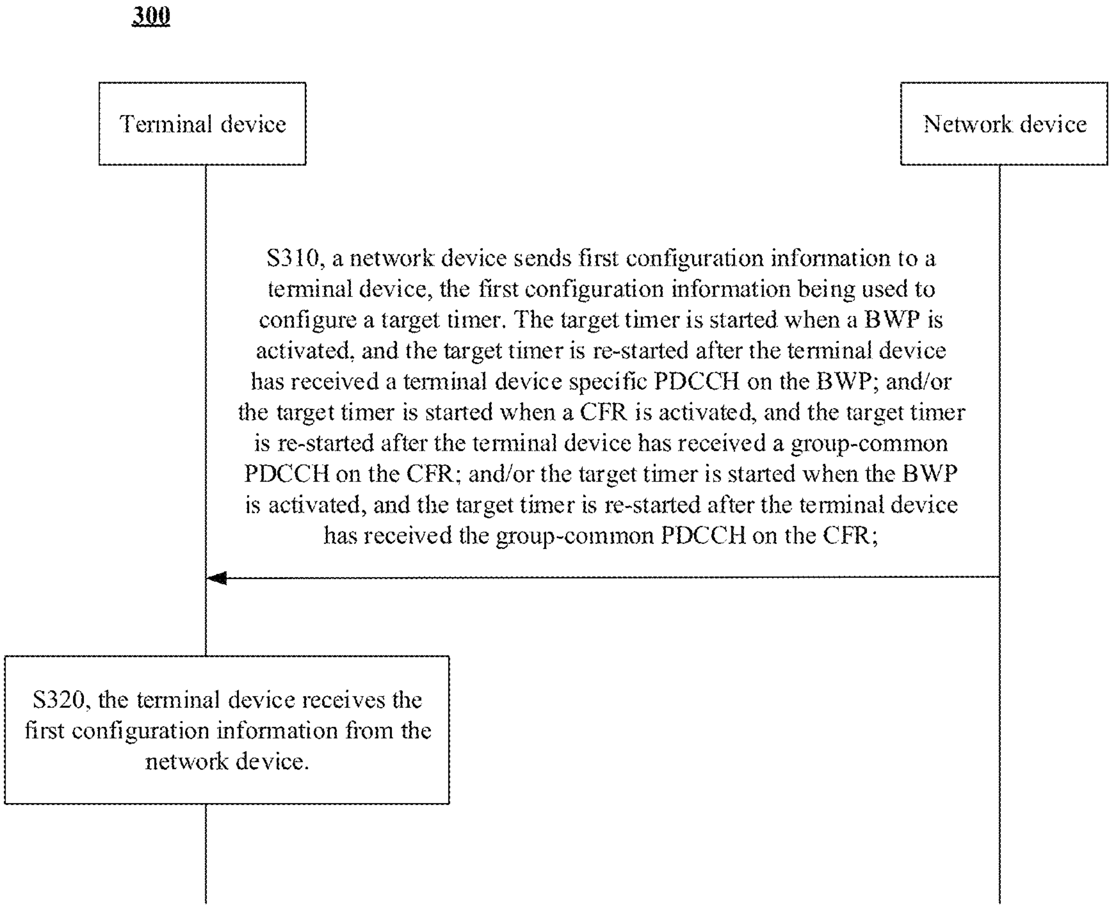
FIG. 9 is a schematic interaction flowchart of another method for wireless communication according to an embodiment of the present disclosure.

FIG. 9 is a schematic interaction flowchart of a method for wireless communication 300 according to an embodiment of the present disclosure. As illustrated in FIG. 9, the method for wireless communication 300 may include at least some of the following operations.

At S310, a network device sends first configuration information to a terminal device, the first configuration information being used to configure a target timer.

The target timer is started when a BWP is activated, and the target timer is re-started after the terminal device has received a terminal device specific PDCCH on the BWP; and/or the target timer is started when a CFR is activated, and the target timer is re-started after the terminal device has received a group-common PDCCH on the CFR; and/or the target timer is started when the BWP is activated, and the target timer is re-started after the terminal device has received the group-common PDCCH on the CFR.

At S320, the terminal device receives the first configuration information from the network device.

In the embodiment of the present disclosure, the target timer may correspond to an MBS or a unicast service. That is, in the embodiments of the present disclosure, a target timer is configured, which takes into account a continuity of data reception for the unicast service and MBS at the same time, so that the data reception would not be interrupted due to expiration of the BWP timer and the BWP switching. In this way, the unicast service and MBS are not only supported at the same time, but also the reliability of a system is improved.

In embodiments of the present disclosure, “timer” may also be referred to as “clock” or “counter”, which is not limited herein.

In some embodiments, the MBS described in the embodiments of the present disclosure also may be an MBMS service, which is not limited in this application.

In some embodiments, the application may be applied to a unicast service transmission system in addition to broadcast and multicast systems.

In some embodiments, the first configuration information is carried by one of the following:

an RRC signaling, DCI, an MAC CE, a broadcast message.

Specifically, for example, the first configuration information may be one or more elements in a signaling which carry the first configuration information, may be one or more fields in the first signaling, and may be one or more regions in the first signaling.

In some embodiments, the BWP is a terminal device specific downlink BWP (DL BWP) activated by a unicast service, or the BWP is a group-common CFR (GC-CFR) activated by an MBS, or the BWP is a group-common MBS (GC-MBS) specific BWP activated by the MBS.

In some embodiments, the CFR includes part of resources in a terminal device specific downlink BWP on a frequency domain. That is, the terminal device specific downlink BWP includes the CFR. In this case, the CFR is not a BWP, but a frequency domain bandwidth attached to the BWP, and all other parameters of the CFR are consistent with the BWP, except that the timer defined in the present disclosure is inconsistent.

In some embodiments, the CFR includes part or all of resources in an MBS specific BWP on the frequency domain. That is, the CFR is an MBS specific BWP for receiving the MBS. At this time, a configuration on the CFR and configuration parameters of the terminal device specific downlink BWP are independent of each other, that is, they may be the same or different.

Specifically, for example, the BWP contains the CFR, which is activated by default when the BWP is activated. In this case, the target timer is started when the BWP is activated, and the target timer is re-started after the terminal device has received the group-common PDCCH on the CFR.

In some embodiments, when the target timer expires, the terminal device is switched from the BWP to another BWP. That is, when the target timer expires, the terminal device is switched from the currently activated BWP to another BWP.

In some embodiments, the GC-PDCCH is used to schedule an MBS.

In some embodiments, the terminal device specific PDCCH is used to schedule a unicast service, or the terminal device specific PDCCH is used to schedule an MBS.

Figure 10:
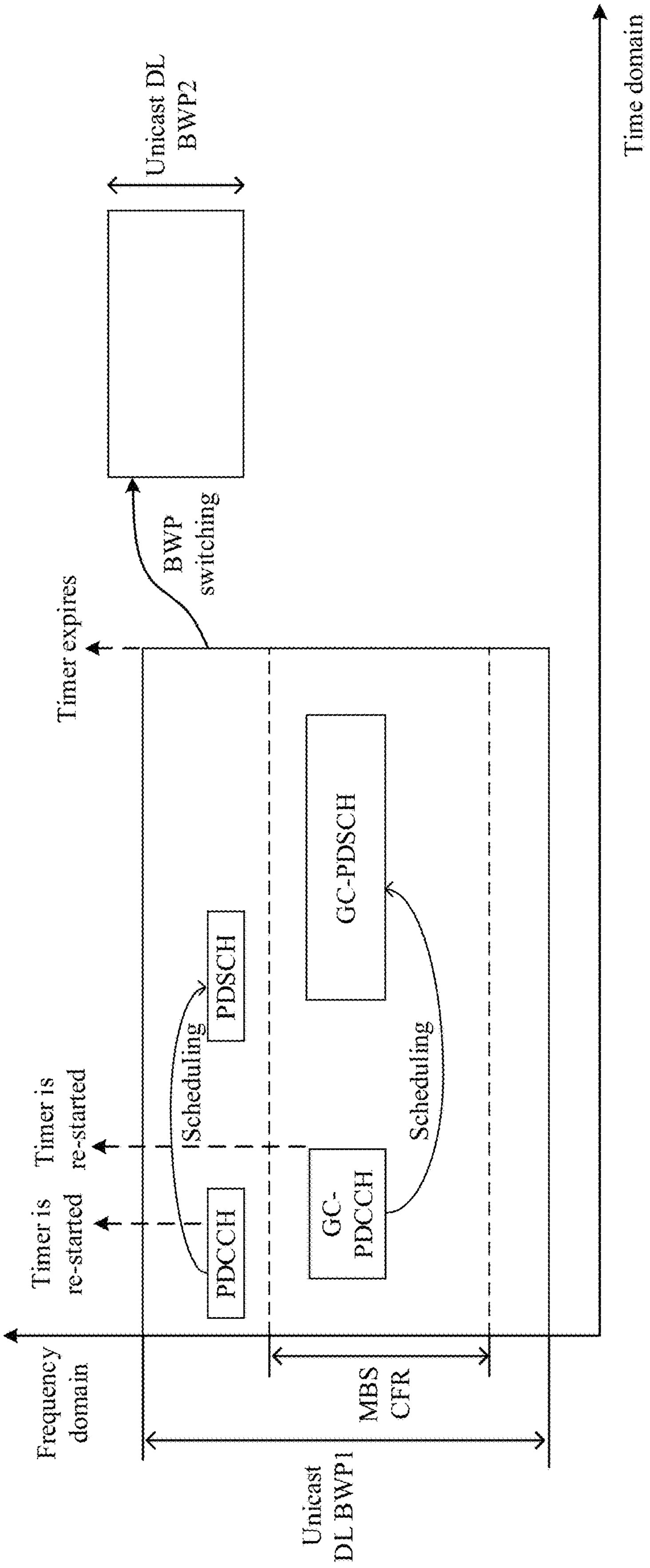
FIG. 10 is another schematic diagram of re-starting a timer provided by an embodiment of the present disclosure.

In some embodiments, the network device configures the timer (i.e., the above target timer) by the first configuration information, as illustrated in FIG. 10, the unicast DL BWP1 includes an MBS CFR, the timer is started when the unicast DL BWP1 is activated, the timer is re-started after the terminal device has received PDCCH (such as a terminal device specific PDCCH) on the unicast DL BWP1, the timer is re-started after the terminal device has received GC-PDCCH on the MBS CFR, and the terminal device is switched from unicast DL BWP1 to unicast DL BWP2 when the timer expires.

In some embodiments, the target timer is paused or suspended when the terminal device receives a terminal device specific PDSCH on the BWP, and the target timer resumes operation after the terminal device specific PDSCH has been completely received.

In some embodiments, the target timer is paused or suspended when the terminal device receives a GC-PDSCH on the CFR, and the target timer resumes operation after the GC-PDSCH has been completely received.

In some embodiments, the terminal device specific PDSCH corresponds to a unicast service, or the terminal device specific PDSCH corresponds to an MBS.

In some embodiments, the GC-PDSCH corresponds to an MBS.

In some embodiments, a PDSCH for scheduling the unicast service is scrambled by using the C-RNTI; and/or, the UE specific PDSCH for scheduling the MBS is scrambled by using the C-RNTI.

In some embodiments, a GC-PDSCH for scheduling the MBS is scrambled by using the group-common RNTI (G-RNTI); and/or, the UE specific PDSCH for scheduling the MBS is scrambled by using the C-RNTI.

Figure 11:
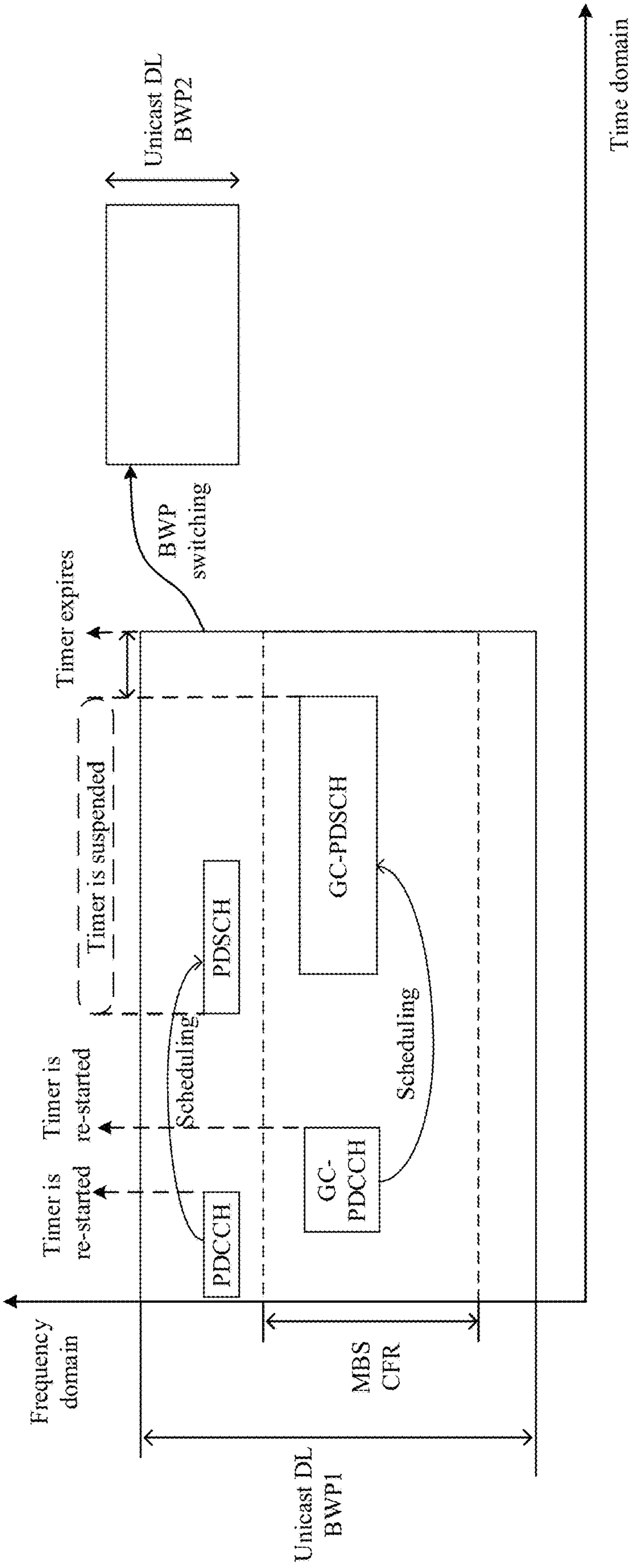
FIG. 11 is another schematic diagram of re-starting and suspending a timer provided by an embodiment of the present disclosure.

In some embodiments, the network device configures the timer (i.e., the above target timer) by the first configuration information, as illustrated in FIG. 11, the unicast DL BWP1 includes an MBS CFR, the timer is started when the unicast DL BWP1 is activated, the timer is re-started after the terminal device has received PDCCH (such as a terminal device specific PDCCH) on the unicast DL BWP1, and the timer is re-started after the terminal device has received GC-PDCCH on the MBS CFR. The timer is suspended when the terminal device receives the PDSCH scheduled by the PDCCH (such as a terminal device specific PDSCH) on the unicast DL BWP1, and since the terminal device is still receiving the GC-PDSCH scheduled by the GC-PDCCH when the PDSCH has been completely received, the timer resumes operation after the GC-PDSCH has been completely received. The terminal device is switched from the unicast DL BWP1 to the unicast DL BWP2 when the timer expires.

Therefore, in the embodiments of the present disclosure, the network device may configure the target timer. Since the target timer may correspond to the unicast service or the MBS, the target timer is configured, which takes into account a continuity of data reception for the unicast service and MBS at the same time, so that the data reception would not be interrupted due to expiration of the BWP timer and the BWP switching. In this way, the unicast service and MBS are not only supported at the same time, but also the reliability of a system is improved.

The method embodiments of the present disclosure have been described in detail above with reference to FIG. 6 to FIG. 11, and the apparatus embodiments of the present disclosure have been described in detail below with reference to FIG. 12 to FIG. 15. It should be understood that the apparatus embodiments and the method embodiments correspond to each other, and similar descriptions may refer to the method embodiments.

Figure 12:
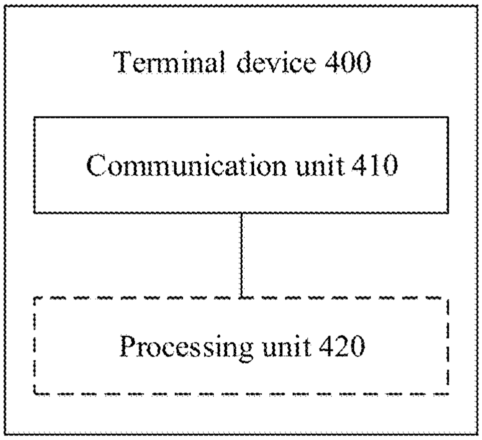
FIG. 12 is a schematic block diagram of a terminal device provided by an embodiment of the present disclosure.

FIG. 12 illustrates a schematic block diagram of a terminal device 400 according to an embodiment of the present disclosure. As illustrated in FIG. 12, the terminal device 400 includes a communication unit 410.

The communication unit 410 is configured to receive a first signaling.

The first signaling includes first information and second information, the first information is used to configure a first timer corresponding to a BWP, and the second information is used to configure a second timer corresponding to a CFR; or the first signaling includes third information, the third information is used to configure the first timer corresponding to the BWP and the second timer corresponding to the CFR.

In some embodiments, the first timer is started when the BWP is activated, and the first timer is re-started after the terminal device has received a terminal device specific PDCCH on the BWP; and/or the second timer is started when the CFR is activated, and the second timer is re-started after the terminal device has received a group-common PDCCH on the CFR; and/or the first timer and the second timer are started when the BWP is activated, the first timer is re-started after the terminal device has received the terminal device specific PDCCH on the BWP, and the second timer is re-started after the terminal device has received the group-common PDCCH on the CFR.

In some embodiments, the group-common PDCCH is used to schedule a multicast broadcast service (MBS).

In some embodiments, the terminal device specific PDCCH is used to schedule a unicast service, or the terminal device specific PDCCH is used to schedule an MBS.

In some embodiments, the first timer is paused or suspended when the terminal device receives a terminal device specific physical downlink shared channel (PDSCH) on the BWP, and the first timer resumes operation after the terminal device specific PDSCH has been completely received; and/or the second timer is paused or suspended when the terminal device receives a group-common PDSCH on the CFR, and the second timer resumes operation after the group-common PDSCH has been completely received.

In some embodiments, the terminal device specific PDSCH corresponds to a unicast service, or the terminal device specific PDSCH corresponds to an MBS.

In some embodiments, the group-common PDSCH corresponds to an MBS.

In some embodiments, the terminal device 400 further includes a processing unit 420.

When the first timer or the second timer expires, the processing unit 420 is configured to switch the terminal device from the BWP to another BWP; or when both the first timer and the second timer expire, the processing unit 420 is configured to switch the terminal device from the BWP to another BWP; or when a timer that expires later among the first timer and the second timer times out, the processing unit 420 is configured to switch the terminal device from the BWP to another BWP; or when a timer that expires earlier among the first timer and the second timer times out, the processing unit 420 is configured to switch the terminal device from the BWP to another BWP.

In some embodiments, the BWP is a terminal device specific downlink BWP activated by a unicast service, or the BWP is a group-common CFR activated by an MBS, or the BWP is a group-common MBS specific BWP activated by the MBS.

In some embodiments, the CFR includes part of resources in a terminal device specific downlink BWP on a frequency domain, or the CFR includes part or all of resources in an MBS specific BWP on the frequency domain.

In some embodiments, when the first information is used to configure the first timer and the second information is used to configure the second timer, the first timer is configured based on a BWP of a unicast service, and the second timer is configured based on a BWP of an MBS, or the second timer is configured based on a CFR of the MBS.

In some embodiments, when the third information is used to configure the first timer and the second timer, the first timer and the second timer are configured based on a same downlink BWP.

In some embodiments, the communication unit may be a communication interface or transceiver or an input-output interface of a communication chip or a system-on-chip. The processing unit may be one or more processors.

It should be understood that the terminal device 400 according to the embodiment of the present disclosure may correspond to the terminal device in the method embodiments of the present disclosure, and the above and other operations and/or functions of the individual units in the terminal device 400 are designed to implement the respective flow of the second network device in the method 200 illustrated in FIG. 6, respectively, which will not be repeated here for the sake of brevity.

Figure 13:
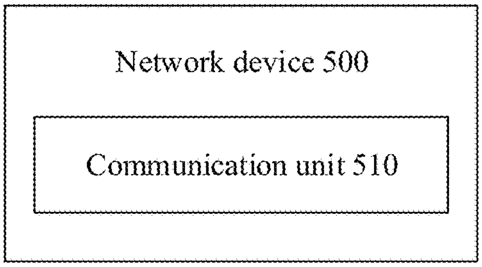
FIG. 13 is a schematic block diagram of a network device provided by an embodiment of the present disclosure.

FIG. 13 shows a schematic block diagram of a network device 500 according to an embodiment of the present disclosure. As illustrated in FIG. 13, the network device 500 includes a communication unit 510.

The communication unit 510 is configured to send a first signaling to a terminal device.

The first signaling includes first information and second information, the first information is used to configure a first timer corresponding to a BWP, and the second information is used to configure a second timer corresponding to a CFR; or the first signaling includes third information, the third information is used to configure the first timer corresponding to the BWP and the second timer corresponding to the CFR.

In some embodiments, the first timer is started when the BWP is activated, and the first timer is re-started after the terminal device has received a terminal device specific PDCCH on the BWP; and/or the second timer is started when the CFR is activated, and the second timer is re-started after the terminal device has received a group-common PDCCH on the CFR; and/or the first timer and the second timer are started when the BWP is activated, the first timer is re-started after the terminal device has received the terminal device specific PDCCH on the BWP, and the second timer is re-started after the terminal device has received the group-common PDCCH on the CFR.

In some embodiments, the group-common PDCCH is used to schedule an MBS.

In some embodiments, the terminal device specific PDCCH is used to schedule a unicast service, or the terminal device specific PDCCH is used to schedule an MBS.

In some embodiments, the first timer is paused or suspended when the terminal device receives a terminal device specific physical downlink shared channel (PDSCH) on the BWP, and the first timer resumes operation after the terminal device specific PDSCH has been completely received; and/or the second timer is paused or suspended when the terminal device receives a group-common PDSCH on the CFR, and the second timer resumes operation after the group-common PDSCH has been completely received.

In some embodiments, the terminal device specific PDSCH corresponds to a unicast service, or the terminal device specific PDSCH corresponds to an MBS.

In some embodiments, the group-common PDSCH corresponds to an MBS.

In some embodiments, the BWP is a terminal device specific downlink BWP activated by a unicast service, or the BWP is a group-common CFR activated by an MBS, or the BWP is a group-common MBS specific BWP activated by the MBS.

In some embodiments, the CFR includes part of resources in a terminal device specific downlink BWP on a frequency domain, or the CFR includes part or all of resources in an MBS specific BWP on the frequency domain.

In some embodiments, when the first information is used to configure the first timer and the second information is used to configure the second timer, the first timer is configured based on a BWP of a unicast service, and the second timer is configured based on a BWP of an MBS, or the second timer is configured based on a CFR of the MBS.

In some embodiments, when the third information is used to configure the first timer and the second timer, the first timer and the second timer are configured based on a same downlink BWP.

In some embodiments, the communication unit may be a communication interface or transceiver or an input-output interface of a communication chip or a system-on-chip. The processing unit may be one or more processors.

It should be understood that the network device 500 according to the embodiment of the present disclosure may correspond to the network device in the method embodiments of the present disclosure, and the above and other operations and/or functions of the individual units in the network device 500 are designed to implement the respective flow of the second network device in the method 200 illustrated in FIG. 6 respectively, which will not be repeated here for the sake of brevity.

Figure 14:
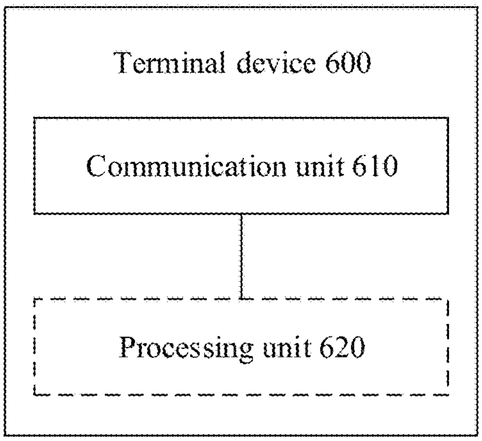
FIG. 14 is a schematic block diagram of another terminal device provided by an embodiment of the present disclosure.

FIG. 14 illustrates a schematic block diagram of a terminal device 600 according to an embodiment of the present disclosure. As illustrated in FIG. 14, the terminal device 600 includes a communication unit 610.

The communication unit 610 is configured to receive first configuration information, the first configuration information being used to configure a target timer.

The target timer is started when a BWP is activated, and the target timer is re-started after the terminal device has received a terminal device specific PDCCH on the BWP; and/or the target timer is started when a CFR is activated, and the target timer is re-started after the terminal device has received a group-common PDCCH on the CFR; and/or the target timer is started when the BWP is activated, and the target timer is re-started after the terminal device has received the group-common PDCCH on the CFR.

In some embodiments, the group-common PDCCH is used to schedule an MBS.

In some embodiments, the terminal device specific PDCCH is used to schedule a unicast service, or the terminal device specific PDCCH is used to schedule an MBS.

In some embodiments, the target timer is paused or suspended when the terminal device receives a terminal device specific physical downlink shared channel (PDSCH) on the BWP, and the target timer resumes operation after the terminal device specific PDSCH has been completely received; and/or the target timer is paused or suspended when the terminal device receives a group-common PDSCH on the CFR, and the target timer resumes operation after the group-common PDSCH has been completely received.

In some embodiments, the terminal device specific PDSCH corresponds to a unicast service, or the terminal device specific PDSCH corresponds to an MBS.

In some embodiments, the group-common PDSCH corresponds to an MBS.

In some embodiments, the terminal device 600 further includes a processing unit 620.

When the target timer expires, the processing unit is configured to switch the terminal device from the BWP to another BWP.

In some embodiments, the BWP is a terminal device specific downlink BWP activated by a unicast service, or the BWP is a group-common CFR activated by an MBS, or the BWP is a group-common MBS specific BWP activated by the MBS.

In some embodiments, the CFR includes part of resources in a terminal device specific downlink BWP on a frequency domain, or the CFR includes part or all of resources in an MBS specific BWP on the frequency domain.

In some embodiments, the communication unit may be a communication interface or transceiver or an input-output interface of a communication chip or a system-on-chip. The processing unit may be one or more processors.

It should be understood that the terminal device 600 according to the embodiment of the present disclosure may correspond to the terminal device in the method embodiments of the present disclosure, and the above and other operations and/or functions of the individual units in the terminal device 600 are designed to implement the respective flow of the second network device in the method 300 illustrated in FIG. 9, respectively, which will not be repeated here for the sake of brevity.

Figure 15:
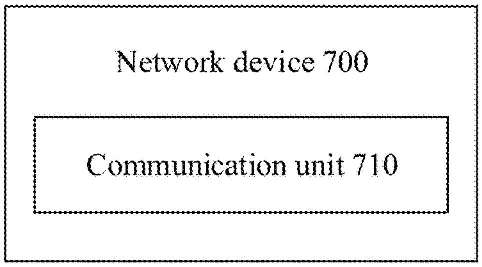
FIG. 15 is a schematic block diagram of another network device provided by an embodiment of the present disclosure.

FIG. 15 shows a schematic block diagram of a network device 700 according to an embodiment of the present disclosure. As illustrated in FIG. 15, the network device 700 includes a communication unit 710.

The communication unit 710 is configured to send first configuration information to a terminal device, the first configuration information being used to configure a target timer.

The target timer is started when a BWP is activated, and the target timer is re-started after the terminal device has received a terminal device specific PDCCH on the BWP; and/or the target timer is started when a CFR is activated, and the target timer is re-started after the terminal device has received a group-common PDCCH on the CFR; and/or the target timer is started when the BWP is activated, and the target timer is re-started after the terminal device has received the group-common PDCCH on the CFR.

In some embodiments, the group-common PDCCH is used to schedule an MBS.

In some embodiments, the terminal device specific PDCCH is used to schedule a unicast service, or the terminal device specific PDCCH is used to schedule an MBS.

In some embodiments, the target timer is paused or suspended when the terminal device receives a terminal device specific physical downlink shared channel (PDSCH) on the BWP, and the target timer resumes operation after the terminal device specific PDSCH has been completely received; and/or the target timer is paused or suspended when the terminal device receives a group-common PDSCH on the CFR, and the target timer resumes operation after the group-common PDSCH has been completely received.

In some embodiments, the terminal device specific PDSCH corresponds to a unicast service, or the terminal device specific PDSCH corresponds to an MBS.

In some embodiments, the group-common PDSCH corresponds to an MBS.

In some embodiments, the BWP is a terminal device specific downlink BWP activated by a unicast service, or the BWP is a group-common CFR activated by an MBS, or the BWP is a group-common MBS specific BWP activated by the MBS.

In some embodiments, the CFR includes part of resources in a terminal device specific downlink BWP on a frequency domain, or the CFR includes part or all of resources in an MBS specific BWP on the frequency domain.

In some embodiments, the communication unit may be a communication interface or transceiver or an input-output interface of a communication chip or a system-on-chip. The processing unit may be one or more processors.

It should be understood that the network device 700 according to the embodiment of the present disclosure may correspond to the network device in the method embodiments of the present disclosure, and the above and other operations and/or functions of the individual units in the network device 700 are designed to implement the respective flow of the second network device in the method 300 illustrated in FIG. 9 respectively, which will not be repeated here for the sake of brevity.

Figure 16:
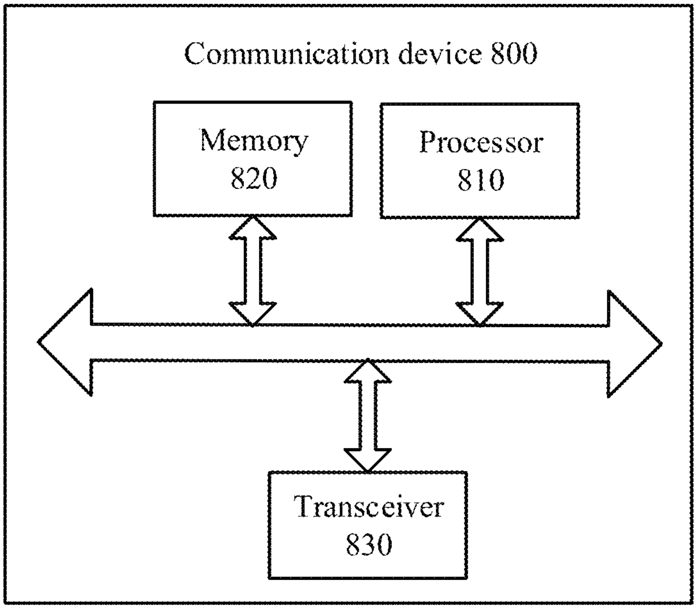
FIG. 16 is a schematic block diagram of a communication device provided by an embodiment of the present disclosure.

FIG. 16 is a schematic structural diagram of a communication device 800 provided by an embodiment of the present disclosure. A communication device 800 illustrated in FIG. 16 includes a processor 810 that may call and execute a computer program in a memory to implement the method in the embodiments of the present disclosure.

In some embodiments, as illustrated in FIG. 16, the communication device 800 may also include a memory 820. The processor 810 may call and execute a computer program from memory 820 to implement the method in the embodiments of the present disclosure.

The memory 820 may be a separate device independent of the processor 810 or may be integrated in the processor 810.

In some embodiments, as illustrated in FIG. 16, the communication device 800 may also include a transceiver 830. The processor 810 may control the transceiver 830 to communicate with other devices, and in particular send information or data to other devices, or receive information or data sent by other devices.

The transceiver 830 may include a transmitter and a receiver. The transceiver 830 may further include antennas. The number of antennas may be one or more.

In some embodiments, the communication device 800 may be specifically a network device of the embodiments of the present disclosure, and the communication device 800 may implement corresponding processes implemented by the network device in various methods of the embodiments of the present disclosure, which will not be repeated here for the sake of brevity.

In some embodiments, the communication device 800 specifically may be a terminal device of embodiments of the present disclosure, and the communication device 800 may implement corresponding processes implemented by the terminal device in the respective methods of the embodiments of the present disclosure, which will not be repeated here for the sake of brevity.

Figure 17:
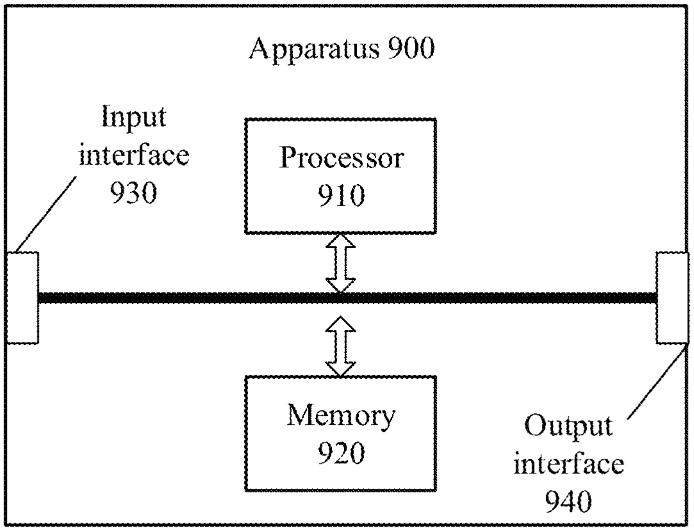
FIG. 17 is a schematic block diagram of an apparatus provided by an embodiment of the present disclosure.

FIG. 17 is a schematic structural diagram of an apparatus according to an embodiment of the present disclosure. An apparatus 900 illustrated in FIG. 17 includes a processor 910 that may call and execute a computer program from memory to implement the method in the embodiments of the present disclosure.

In some embodiments, as illustrated in FIG. 17, the apparatus 900 may also include a memory 920. The processor 910 may call and execute a computer program from memory 920 to implement the method in the embodiments of the present disclosure.

The memory 920 may be a separate device independent of the processor 910 or may be integrated in the processor 910.

In some embodiments, the apparatus 900 may also include an input interface 930. The processor 910 may control the input interface 930 to communicate with other devices or chips, and in particular obtain information or data sent by other devices or chips.

In some embodiments, the apparatus 900 may also include an output interface 940. The processor 910 may control the output interface 940 to communicate with other devices or chips, and in particular output information or data to other devices or chips.

In some embodiments, the apparatus may be applied to be a network device of the embodiments of the present disclosure, and the apparatus may implement corresponding processes implemented by the network device in the respective methods of the embodiments of the present disclosure, which will not be repeated here for the sake of brevity.

In some embodiments, the apparatus may be applied to be a terminal device of the embodiments of the present disclosure, and the apparatus may implement corresponding processes implemented by the terminal device in the respective methods of the embodiments of the present disclosure, which will not be repeated here for the sake of brevity.

In some embodiments, the apparatus mentioned in the embodiments of the present disclosure may also be a chip. It should be understood that the chip referred to in embodiments of the present disclosure may also be referred to as system-level chip, system chip, chip system or system-on-chip or the like.

Figure 18:
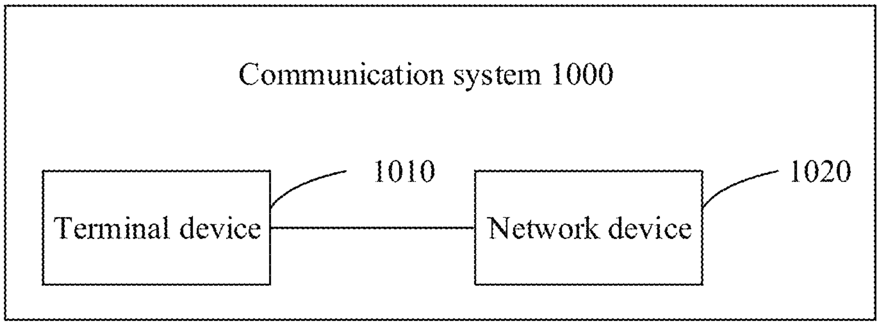
FIG. 18 is a schematic block diagram of a communication system provided by an embodiment of the present disclosure.

FIG. 18 is a schematic block diagram of a communication system 1000 provided by an embodiment of the present disclosure. As illustrated in FIG. 18, the communication system 1000 includes a terminal device 1010 and a network device 1020.

The terminal device 1010 may be configured to implement corresponding functions implemented by the terminal device in the above method, and the network device 1020 may be configured to implement corresponding functions implemented by the network device in the above method, which will not be repeated here for the sake of brevity.

It should be understood that the processor may be an integrated circuit chip having signal processing capability. In implementation, the operations of the above method embodiments may be accomplished by integrated logic circuitry of hardware in processor or instructions in the form of software. The processor may be a general purpose processor, a digital signal processor (DSP), an application specific integrated circuit (ASIC), a field programmable gate array (FPGA) or other programmable logic devices, discrete gates or transistor logic devices, or discrete hardware components. The processor may implement or execute the methods, operations and logic diagrams disclosed in the embodiments of the present disclosure. The general purpose processor may be a microprocessor or any conventional processor. The operations of the method disclosed in the embodiments of the present disclosure may be directly embodied as being executed by a hardware decoding processor or being executed by the hardware and software modules in a decoding processor. The software modules may be located in a storage medium mature in the art, such as a random access memory, a flash memory, a read-only memory, a programmable read-only memory or an electrically erasable programmable memory, a register, etc. The storage medium is located in the memory, and the processor reads the information in the memory to complete the operations of the aforementioned method in conjunction with its hardware.

It will be appreciated that the memory in the embodiments of the present disclosure may be a volatile memory or a non-volatile memory, or may also include both a volatile memory and a non-volatile memory. The non-volatile memory may be a read-only memory (ROM), a programmable ROM (PROM), an erasable PROM (EPROM), an electrically EPROM (EPROM) or a flash memory. The volatile memory may be a random access memory (RAM), which serves as an external cache. By way of illustration but not limitation, many forms of RAM are available, such as a static RAM (SRAM), a dynamic RAM (DRAM), a synchronous DRAM (SDRAM), a double data rate SDRAM (DDR SDRAM), an enhanced SDRAM (ESDRAM), a synchronous link DRAM (SLDRAM), a direct rambus RAM (DR RAM). It should be noted that the memory in the systems and methods described herein is intended to include, but is not limited to, these memories and any other suitable types of memory.

It should be understood that the memory described above is exemplary but not limiting. For example, the memory in the embodiments of the present disclosure may also be a static RAM (SRAM), a dynamic RAM (DRAM), a synchronous DRAM (SDRAM), a double data rate SDRAM (DDR SDRAM), an enhanced SDRAM (ESDRAM), a synchronous link DRAM (SLDRAM), a direct rambus RAM (DR RAM), etc. That is, the memory in the embodiments of the present disclosure is intended to include, but is not limited to, these memories and any other suitable types of memory.

In an embodiment of the present disclosure, there is further provided a computer-readable storage medium, which is configured to store a computer program.

In some embodiments, the computer readable storage medium may be applied to the network device of the embodiments of the present disclosure, and the computer program causes a computer to implement corresponding processes implemented by the network device in the methods of the embodiments of the present disclosure, which will not be repeated here for the sake of brevity.

In some embodiments, the computer readable storage medium may be applied to the terminal device of the embodiments of the present disclosure, and the computer program causes a computer to implement corresponding processes implemented by the terminal device in the methods of the embodiments of the present disclosure, which will not be repeated here for the sake of brevity.

In an embodiment of the present disclosure, there is further provided a computer program product, which includes computer program instructions.

In some embodiments, the computer program product may be applied to the network device of the embodiments of the present disclosure, and the computer program instructions cause a computer to implement corresponding processes implemented by the network device in the methods of the embodiments of the present disclosure, which will not be repeated here for the sake of brevity.

In some embodiments, the computer program product may be applied to the terminal device of the embodiments of the present disclosure, and the computer program instructions cause a computer to implement corresponding processes implemented by the terminal device in the methods of the embodiments of the present disclosure, which will not be repeated here for the sake of brevity.

In an embodiment of the present disclosure, there is further provided a computer program.

In some embodiments, the computer program may be applied to the network device of the embodiments of the present disclosure, the computer program, when running on a computer, causes the computer to implement corresponding processes implemented by the network device in the methods of the embodiments of the present disclosure, which will not be repeated here for the sake of brevity.

In some embodiments, the computer program may be applied to the terminal device of the embodiments of the present disclosure, the computer program, when running on a computer, causes the computer to implement corresponding processes implemented by the terminal device in the methods of the embodiments of the present disclosure, which will not be repeated here for the sake of brevity.

Those of ordinary skill in the art may realize that the various example units and algorithm steps described in connection with the embodiments disclosed herein may be implemented in electronic hardware or a combination of computer software and electronic hardware. Whether these functions are performed in hardware or software depends on the specific application and design constraints of the technical solution. Professionals may use different methods for each particular application to implement the described functionality, but such implementation should not be considered beyond the scope of the present disclosure.

Those skilled in the art will clearly appreciate that, for convenience and conciseness of description, the specific operating processes of the above-described systems, apparatuses and units may refer to the corresponding processes in the aforementioned method embodiments and will not be repeated herein.

In several embodiments provided herein, it should be understood that the disclosed systems, apparatuses and methods may be implemented in other manners. For example, the above-described embodiments of the apparatus is only schematic, for example, the division of the units is only a logical function division, and in practice, there may be another division manner, for example, multiple units or components may be combined or integrated into another system, or some features may be ignored or not performed. On the other hand, the coupling or direct coupling or communication connection between each other illustrated or discussed may be indirect coupling or communication connection through some interfaces, devices or units, and may be electrical, mechanical or other form.

The units illustrated as separate elements may or may not be physically separated, and the elements displayed as units may or may not be physical units, i.e. may be located in a place, or may be distributed over a plurality of network units. Part or all of the units may be selected according to the actual needs to achieve the purpose of the embodiments of the present disclosure.

In addition, each functional unit in each embodiment of the present disclosure may be integrated in one processing unit, each unit may exist physically alone, or two or more units may be integrated in one unit.

When the functions are realized in the form of software functional units and sold or used as an independent product, they may be stored in a computer readable storage medium. Based on such an understanding, the technical solutions according to the disclosure in essence or the part contributing to the prior art or the part of the technical solution may be embodied in the form of a software product, and the computer software product is stored in a storage medium, which includes several instructions so that a computer device (may be a personal computer, a server, a network device or the like) implements all or part of the method according to respective embodiments of the disclosure. The aforementioned storage medium includes various media capable of storing a program code such as a USB disk, a mobile hard drive disk, a read-only memory (ROM), a random access memory (RAM), a magnetic disk or an optical disk.

The above is only the specific implementation of the present disclosure, but the scope of protection of the present disclosure is not limited thereto. Any person skilled in the art may easily think of changes or substitutions within the technical scope disclosed in the present disclosure, which should be covered within the protection scope of the present disclosure. Therefore, the scope of protection of the present disclosure shall be subject to the scope of protection of the claims.

The invention claimed is:

1. A method for wireless communication, comprising:

receiving, by a terminal device, a first signaling;

wherein the first signaling comprises first information and second information, the first information is used to configure a first timer corresponding to a band width part (BWP), and the second information is used to configure a second timer corresponding to a common frequency resource (CFR); or the first signaling comprises third information, the third information is used to configure the first timer corresponding to the BWP and the second timer corresponding to the CFR, wherein the second timer is started when the CFR is activated, and the second timer is re-started after the terminal device has received a group-common physical downlink control channel (PDCCH) on the CFR; and/or the first timer and the second timer are started when the BWP is activated, the first timer is re-started after the terminal device has received a terminal device specific PDCCH on the BWP, and the second timer is re-started after the terminal device has received the group-common PDCCH on the CFR.

2. The method of claim 1, wherein the group-common PDCCH is used to schedule a multicast broadcast service (MBS).

3. The method of claim 1, wherein the second timer is paused or suspended when the terminal device receives a group-common physical downlink shared channel (PDSCH) on the CFR, and the second timer resumes operation after the group-common PDSCH has been completely received.

4. The method of claim 3, wherein the group-common PDSCH corresponds to an MBS.

5. The method of claim 1, wherein the method further comprises:

switching the terminal device from the BWP to another BWP when the first timer or the second timer expires; or switching the terminal device from the BWP to another BWP when both the first timer and the second timer expire; or switching the terminal device from the BWP to another BWP when a timer that expires later among the first timer and the second timer times out; or switching the terminal device from the BWP to another BWP when a timer that expires earlier among the first timer and the second timer times out.

6. The method of claim 1, wherein the BWP is a group-common CFR activated by an MBS.

7. The method of claim 1, wherein when the first information is used to configure the first timer and the second information is used to configure the second timer, the first timer is configured based on a BWP of a unicast service, and the second timer is configured based on a BWP of an MBS, or the second timer is configured based on a CFR of the MBS.

8. A method for wireless communication, comprising:

sending, by a network device, a first signaling to a terminal device;

wherein the first signaling comprises first information and second information, the first information is used to configure a first timer corresponding to a band width part (BWP), and the second information is used to configure a second timer corresponding to a common frequency resource (CFR); or the first signaling comprises third information, the third information is used to configure the first timer corresponding to the BWP and the second timer corresponding to the CFR, wherein the second timer is started when the CFR is activated, and the second timer is re-started after the terminal device has received a group-common physical downlink control channel (PDCCH) on the CFR; and/or the first timer and the second timer are started when the BWP is activated, the first timer is re-started after the terminal device has received a terminal device specific PDCCH on the BWP, and the second timer is re-started after the terminal device has received the group-common PDCCH on the CFR.

9. The method of claim 8, wherein the terminal device specific PDSCH corresponds to an MBS.

10. The method of claim 8, wherein the second timer is paused or suspended when the terminal device receives a group-common physical downlink shared channel (PDSCH) on the CFR, and the second timer resumes operation after the group-common PDSCH has been completely received, and the group-common PDSCH corresponds to an MBS.

11. A terminal device, comprising: a processor and a memory for storing a computer program, wherein the processor is configured to call and execute the computer program stored in the memory to cause the terminal device to:

receive a first signaling;

wherein the first signaling comprises first information and second information, the first information is used to configure a first timer corresponding to a band width part (BWP), and the second information is used to configure a second timer corresponding to a common frequency resource (CFR); or the first signaling comprises third information, the third information is used to configure the first timer corresponding to the BWP and the second timer corresponding to the CFR, wherein the second timer is started when the CFR is activated, and the second timer is re-started after the terminal device has received a group-common physical downlink control channel (PDCCH) on the CFR; and/or the first timer and the second timer are started when the BWP is activated, the first timer is re-started after the terminal device has received a terminal device specific PDCCH on the BWP, and the second timer is re-started after the terminal device has received the group-common PDCCH on the CFR.

12. The terminal device of claim 11, wherein the group-common PDCCH is used to schedule a multicast broadcast service (MBS).

13. The terminal device of claim 11, wherein the second timer is paused or suspended when the terminal device receives a group-common physical downlink shared channel (PDSCH) on the CFR, and the second timer resumes operation after the group-common PDSCH has been completely received, and the group-common PDSCH corresponds to an MBS.

14. The terminal device of claim 11, wherein the processor is further configured to cause the terminal device to:

switch the terminal device from the BWP to another BWP when the first timer or the second timer expires; or switch the terminal device from the BWP to another BWP when both the first timer and the second timer expire; or switch the terminal device from the BWP to another BWP when a timer that expires later among the first timer and the second timer times out; or switch the terminal device from the BWP to another BWP when a timer that expires earlier among the first timer and the second timer times out.

15. The terminal device of claim 11, wherein the BWP is a group-common CFR activated by an MBS.

16. A network device, comprising: comprising a processor and a memory for storing a computer program, wherein the processor is configured to call and execute the computer program stored in the memory to cause the network device to:

send a first signaling to a terminal device;

wherein the first signaling comprises first information and second information, the first information is used to configure a first timer corresponding to a band width part (BWP), and the second information is used to configure a second timer corresponding to a common frequency resource (CFR); or the first signaling comprises third information, the third information is used to configure the first timer corresponding to the BWP and the second timer corresponding to the CFR, wherein the second timer is started when the CFR is activated, and the second timer is re-started after the terminal device has received a group-common physical downlink control channel (PDCCH) on the CFR; and/or the first timer and the second timer are started when the BWP is activated, the first timer is re-started after the terminal device has received a terminal device specific PDCCH on the BWP, and the second timer is re-started after the terminal device has received the group-common PDCCH on the CFR.

17. The network device of claim 16, wherein the terminal device specific PDSCH corresponds to an MBS.

18. The network device of claim 16, wherein the second timer is paused or suspended when the terminal device receives a group-common physical downlink shared channel (PDSCH) on the CFR, and the second timer resumes operation after the group-common PDSCH has been completely received, and the group-common PDSCH corresponds to an MBS.

19. The network device of claim 16, wherein the group-common PDCCH is used to schedule a multicast broadcast service (MBS).

20. The network device of claim 16, wherein when the first information is used to configure the first timer and the second information is used to configure the second timer, the first timer is configured based on a BWP of a unicast service, and the second timer is configured based on a BWP of an MBS, or the second timer is configured based on a CFR of the MBS.

* * * * *